US010410235B2

(12) United States Patent
Faith

(10) Patent No.: US 10,410,235 B2
(45) Date of Patent: Sep. 10, 2019

(54) USING MIX-MEDIA FOR PAYMENT AUTHORIZATION

(71) Applicant: VISA INTERNATIONAL SERVICE ASSOCIATION, San Francisco, CA (US)

(72) Inventor: Patrick Faith, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 1557 days.

(21) Appl. No.: 14/247,250

(22) Filed: Apr. 7, 2014

(65) Prior Publication Data

US 2014/0304055 A1 Oct. 9, 2014

Related U.S. Application Data

(62) Division of application No. 13/433,059, filed on Mar. 28, 2012, now Pat. No. 8,725,652.

(60) Provisional application No. 61/468,646, filed on Mar. 29, 2011.

(51) Int. Cl.
*G06Q 30/02* (2012.01)
*G06Q 20/40* (2012.01)

(52) U.S. Cl.
CPC ......... *G06Q 30/0225* (2013.01); *G06Q 20/40* (2013.01); *G06Q 20/40145* (2013.01)

(58) Field of Classification Search
USPC ...................................... 705/64, 67; 713/186
See application file for complete search history.

(56) References Cited

U.S. PATENT DOCUMENTS

| 7,512,567 | B2 | 3/2009 | Bemmel et al. |
| 8,725,652 | B2 | 5/2014 | Faith |
| 9,100,675 | B2 * | 8/2015 | Gillies .................. G06Q 30/02 |
| 2006/0069922 | A1 | 3/2006 | Jelinek et al. |
| 2007/0168295 | A1 | 7/2007 | Wu |
| 2008/0094472 | A1 | 4/2008 | Ayer et al. |

(Continued)

FOREIGN PATENT DOCUMENTS

| JP | 2005-063342 A | 3/2015 |
| KR | 10-2000-0036825 A | 7/2000 |

(Continued)

OTHER PUBLICATIONS

International Search Report and Written Opinion for PCT Application No. PCT/US2012/030993 dated Sep. 27, 2012.

(Continued)

*Primary Examiner* — Jay Huang
(74) *Attorney, Agent, or Firm* — Kilpatrick Townsend & Stockton LLP

(57) ABSTRACT

Techniques for identifying a user and authenticating payment transactions based on the identification include requesting the user to send his audio, video, and/or image from the point of sale location and comparing the received audio, video, and/or image to an audio/video/image on file to identify and authenticate the user as being the official holder of the payment device being used in the transaction. Once the user is authenticated, the payment processing can be performed using conventional techniques. Some techniques involve use of accelerometer data associated with the user in addition to or in lieu of the audio, video, and/or image data to perform the identification and authentication of the user.

18 Claims, 15 Drawing Sheets

(56) References Cited

U.S. PATENT DOCUMENTS

| | | | |
|---|---|---|---|
| 2008/0209223 A1* | 8/2008 | Nandy | G06F 21/36 |
| | | | 713/185 |
| 2009/0270743 A1 | 10/2009 | Dugan et al. | |
| 2011/0189981 A1 | 8/2011 | Faith et al. | |
| 2011/0276484 A1* | 11/2011 | Pearson | G06Q 20/38 |
| | | | 705/44 |
| 2012/0278155 A1 | 11/2012 | Faith | |

FOREIGN PATENT DOCUMENTS

| | | |
|---|---|---|
| KR | 10-2004-0076694 A | 9/2004 |
| KR | 10-2006-0089942 A | 8/2006 |
| WO | 2012/135372 A2 | 10/2012 |

OTHER PUBLICATIONS

International Preliminary Report on Patentability for PCT Application No. PCT/US2012/030993 dated Oct. 1, 2013.
Restriction Requirement for U.S. Appl. No. 13/433,059 dated Mar. 20, 2013.
Non-Final Office Action for U.S. Appl. No. 13/433,059 dated May 15, 2013.
Notice of Allowance for U.S. Appl. No. 13/433,059 dated Dec. 16, 2013.

* cited by examiner

USING MIX-MEDIA FOR PAYMENT AUTHORIZATION

CROSS-REFERENCES TO RELATED APPLICATIONS

This application is a divisional patent application of U.S. patent application Ser. No. 13/433,059, filed on Mar. 28, 2012, entitled "Using Mix-Media for Payment Authorization" and claims priority under 35 USC § 119(e) to U.S. Provisional Patent Application No. 61/468,646, filed on Mar. 29, 2011, the disclosures of which are hereby incorporated by reference in their entirety and for all purposes.

BACKGROUND

Payment devices such as credit cards, debit cards, smart cards, mobile phones, etc. have growing in popularity due to the convenience and security they offer over other payment methods such as cash and checks, which are more susceptible to fraud than the payment devices. However, with the growing popularity of these payment devices, especially in the developing countries, criminals are increasingly finding ways to compromise the security offered by the payment devices.

As criminals get more sophisticated, they are increasingly able to "steal" payment device related information such as account numbers and PIN's and then use this information to create fake payment devices. For example, in the United States, credit card related fraud is estimated to be in tens of millions of dollars every year.

Thus, there is a need in the industry to develop more robust identification and authentication techniques to minimize or prevent such fraud.

SUMMARY

Embodiment of the present invention generally relate to payment devices such as credit cards and the like. More particularly, certain embodiments of the present invention provide techniques for advanced identification and authentication techniques in payment transaction processing.

Some embodiments of the present invention provide a computer server system. The computer server system including a processor, a storage medium coupled to the processor and storing association information between images and/or videos of a plurality of users and associated payment devices, and an interface module configured to communicate with one or more external systems. The processor may receive a payment request message including information about a payment device and send a first message to a user device of a user associated with the payment device requesting the user to send a video and/or an image of him/her. The processor may further receive a second message from the user device including the image and/or the video and compare the received image and/or video with the plurality of images and/or videos stored in the storage medium to determine whether the received image and/or video matches any of the plurality of images and/or videos. If a match is found, the processor may determine whether the user in the received image and/or video is the same as the user associated with the payment device and may send a payment authorization message to an issuer computer if it is determined that the user in the received image and/or video is same as the user associated with the payment device.

Some embodiments of the present invention provide a server computer. The server computer includes a processor, a storage medium coupled to the processor and storing associating information between accelerometer data of a plurality of users and one or more payment devices, and an interface module configured to communicate with one or more external systems. The processor is configured to receive a request for processing a payment transaction including information about a first payment device. The processor may then determine a user associated with the first payment device and send a request to a user device associated with the user requesting the user to send a video of him/her. Thereafter the processor may receive the video of the user in response to the request, the video including first accelerometer data associated with the video. The processor may extract the first accelerometer data from the received video and compare that to the accelerometer data associated with the plurality of users. If a match is found, the processor may determine whether a second payment device associated with the matched accelerometer data is same as the first payment device and send a payment authorization message to an issuer computer associated with the first payment device if the second payment device is same as the first payment device.

Some embodiments of the present invention provide a method for processing a payment transaction by a server computer. The method includes receiving a request to process a payment transaction including information about a first payment device used in the payment transaction. The method further includes sending a first message to a user device of a user associated with the first payment device requesting the user to send a photograph of him/her and receiving a photograph of the user from the user device. The method further includes comparing the photograph with a plurality photographs in a database to determine the identity of the user. If a match is found between the photograph and a photograph in the database, the method includes determining information about a second payment device associated the photograph in the database and determining whether the information about the second payment device matches information about the first payment device, and sending to an issuer computer associated with the first payment device, a payment authorization message.

Other embodiments of the present invention provide a method including receiving information about a coupon and an image, a video, or audio of a first user to whom the coupon is issued and receiving transaction information including an image, a video, or audio of a second user attempting to use the coupon and the information about the coupon. The method further includes determining whether the second user is same as the first user by comparing the image, the video, or the audio of the first user with the image, the video, or the audio of the second user and if it is determined that the second user is same as the first user, the method includes authorizing use of the coupon.

Certain embodiments of the present invention provide a method comprising receiving a first device identifier (ID), a first coupon identifier (ID) associated with first coupon data, and an image, audio, or video of a first user and creating association information between the first device identifier (ID), the first coupon identifier (ID), and the image, audio, or video of the first user. The method further includes receiving a second device ID, a second coupon ID associated with second coupon data, and an image, audio, or video of a second user and comparing the first device identifier (ID), the first coupon identifier (ID), and the image, audio, or video of the first user to the second device ID, the second coupon ID, and the image, audio, or video of the second user to determine whether the second user is same as the first user. The method further includes authorizing use of the second coupon data if it is determined that the second user is same as the first user and the second coupon data is same as the first coupon data.

Certain embodiments of the present invention provide a method performed by a server computer that includes receiving a request to process a payment transaction that includes information about a first payment device used in the payment transaction. The method further includes sending a first message to a first user device of a first user associated with the first payment device. The first message requests the first user to send a photograph of him/her. The method then includes receiving the photograph of the first user from the first user device and comparing the photograph with a plurality photographs in a database to determine the identity of the first user. The server computer may determine that another photograph in the database matches the received photograph of the first user. The method further includes determining a second user associated with the other photograph and determining whether the second user is same as the first user bases at least in part on the photograph.

The following detailed description together with the accompanying drawings will provide a better understanding of the nature and advantages of the present invention.

DETAILED DESCRIPTION

Embodiments of the present invention provide techniques for identifying and authenticating user requesting a payment transaction and using the identification information to process the payment transaction.

Certain embodiments of the present invention provide for a method for authorizing payments. In the method, when an authorization request message is received, e.g., by a server computer in a payment processing network or elsewhere, authentication request message may be sent to the user associated with the payment account from which the payment is to be made. The authentication request message may ask the user to send an image or video of him/her at the point of transaction. The image or video may include one or more attributes of the user such as face, fingerprints, etc. Once the image or video is received, it may be compared with an image or video on file for that payment account to see whether the attributes of the user in the received image or video match any user attributes in the stored information for the payment account. If the one or more attributes match, the user is authenticated and the payment transaction is processed.

In some embodiments, in addition to the image or video, the server computer in the payment processing network or elsewhere may also receive accelerometer data associated with the image or video. In this instance, a comparison between received accelerometer data and stored accelerometer data for the user is made to determine the user's identity. In still other embodiments, audio data identifying an audio characteristic of the user may be used to perform the authentication process.

Figure 1:
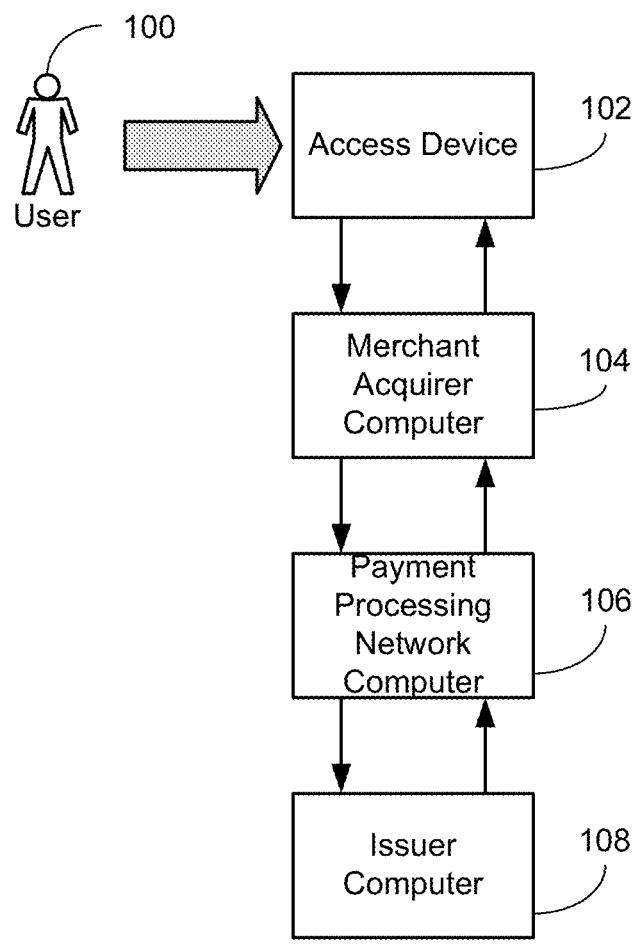
FIG. 1 illustrates a conventional payment processing flow.

In order to provide a better understanding of the present disclosure, a brief review of transaction processing as it exists today is provided with reference to FIG. 1. For ease of discussion, a transaction conducted in a physical store is described. However, it should be understood that similar steps occur in any type of transaction, including online transactions. In a typical transaction, a user 100 may select goods or services to purchase at a merchant. The user may then pay for the goods or services by presenting a payment device, such as a debit or credit card, to the merchant. The merchant may then swipe the payment device through an access device 102, e.g., a Point of Sale ("POS") terminal, to read the account number from the payment device.

Access device 102 may then send the account number to a merchant system, where other information related to the transaction, such as purchase amount, may be added. It should be noted that in some cases, the access device and the merchant system are a single device, in which the account number is read, and the purchase amount is keyed in by the merchant. The transaction details, such as the account number and purchase amount are then sent from the merchant system to an acquirer computer 104 to request transaction authorization. An acquirer is generally a bank that holds an account for the merchant in which funds resulting from the transaction may eventually be deposited.

The acquirer computer 104 then receives the transaction details, and determines a payment processing network 106 that may process the transaction. The acquirer computer 104 routes the transaction to the appropriate payment processing network 106, which in turns determines the issuer computer of the payment device. The issuer may operate an issuer computer 108. As mentioned above, an issuer computer 108 may provide the user with an account that holds cash or a line of credit. The payment processing network 106 then routes the transaction to the correct issuer computer 108 for a transaction authorization decision. If the user 100 has sufficient funds in the account or sufficient available credit, the issuer computer 108 may authorize the transaction. The authorization response is transmitted back to the merchant, through the payment processing network computer 106, the acquirer computer 104, and the access device 102. The user 100 has then completed the purchase of the goods or services. At a later point in time, a settling and clearing process may occur, in which the funds are actually transferred from the user's account (or drawn on the line of credit) to the merchant's account at the acquirer. The settlement and clearing process occurs using the account number, wherein a request for funds may be compared to a previous authorization, and if an authorization exists, the funds are transferred.

Transactions may become even more complicated when a Personal Identification Number ("PIN") is required. For example, in the case of some debit card transactions, a PIN must be entered by the user. The PIN is typically entered into the access device in clear form by the user. The PIN is then encrypted using a Pin Encryption Key (PEK) in the access device and is sent to a merchant system, which also knows the PEK. The merchant system, then decrypts the PIN using the PEK, and encrypts it again using an acquirer working key (AWK), which is a key known by the merchant and the acquirer. The acquirer then decrypts the PIN using the AWK and encrypts again using a payment processor key. The payment processor in turn decrypts the PIN and encrypts using an issuer working key. The issuer computer then decrypts the PIN and determines if the PIN is correct. In some embodiments, the user may have to provide the card verification value (CVV) associated with the payment device in order for the transaction to be processed.

In the traditional payment processing scenario described above, the onus of verifying the identity of the user presenting the payment device is on the person operating the access device, e.g., a checkout person at a grocery store. Often, the user is not asked to prove his identity prior to the transaction being processed. Thus, in most cases as long as the account number of the payment device is valid, the transaction is processed. If it is later discovered that the transaction was fraudulent, the original holder of the payment device is only liable for the amount stipulated by the various state and federal laws. Thus, often the issuer of the payment device ends up bearing the cost of fraudulent transactions.

Figure 2:
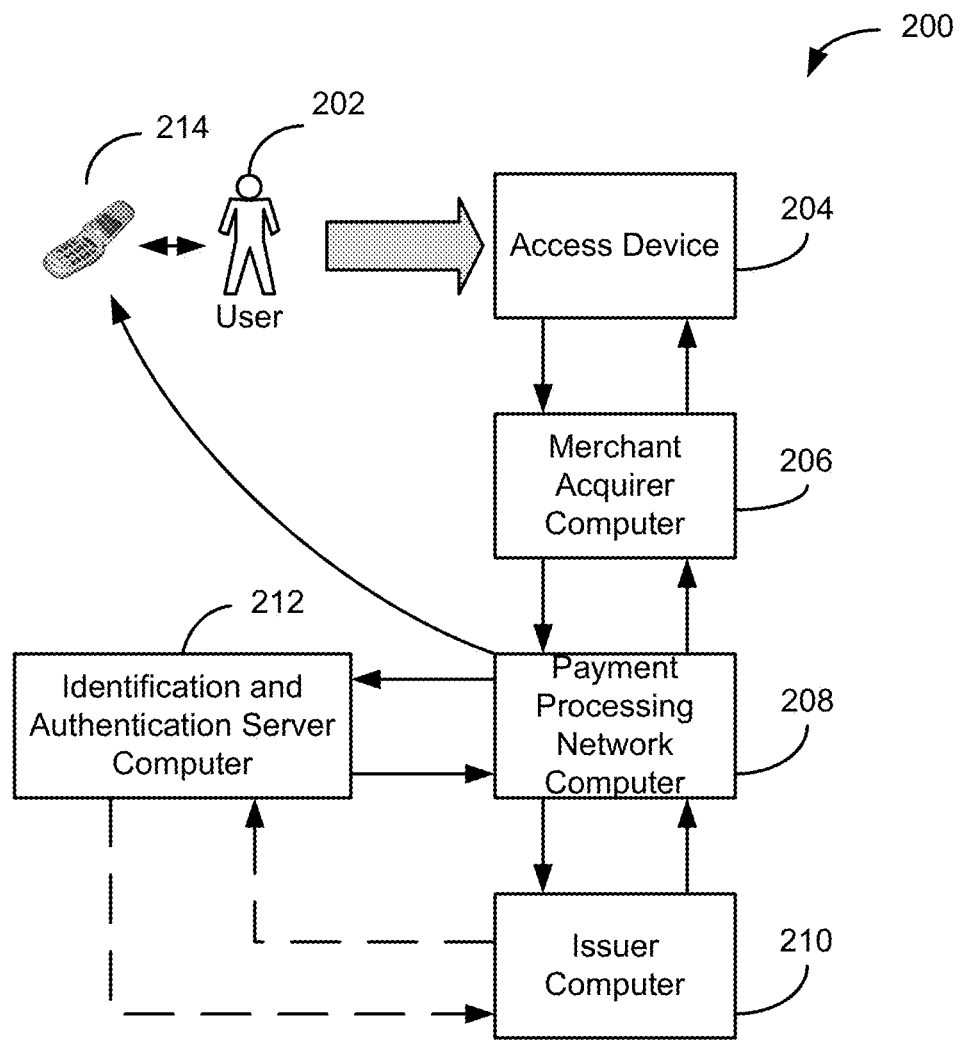
FIG. 2 illustrates a payment processing flow according to an embodiment of the present invention.

FIG. 2 illustrates a simplified flow diagram 200 for processing payment transactions according to an embodiment of the present invention. As illustrated in FIG. 2, a user 202 may present his/her payment device at the access device 204. Access device 204 may communicate with an acquirer computer 206, which in turn may provide the payment device details to a payment processing network computer 208. More specifically, the access device 204 may generate and send an authorization request message to the payment processing network.

A "payment authorization request message" may be a message that includes an issuer account identifier. The issuer account identifier may be a payment card account identifier associated with a payment card. The payment authorization request message may request that an issuer of the payment card authorize a transaction. An authorization request message according to an embodiment of the invention may comply with ISO 8583, which is a standard for systems that exchange electronic transactions made by cardholders using payment cards. The authorization request message may include other data elements including a merchant identifier, an expiration date for the payment device, a service code, and verification values such as CVV (card verification values) values.

All processing until communication with payment processing network computer 208 may occur just like in the traditional scenario described above. However, before payment processing network computer 208 communicates with issuer computer 210 to process the transaction, payment processing network computer 208 communicates with identification and authentication server 212 to verify the identity of user 202 and to authenticate user 202.

A "server computer" can be a powerful computer or a cluster of computers. For example, the server computer can be a large mainframe, a minicomputer cluster, or a group of servers functioning as a unit.

In some embodiments, identification and authentication server 212 may receive the payment device and transaction details in the payment authorization request message from payment processing network computer 208 and request additional details from user 202 via payment processing network computer 208. For example, in one embodiment, identification and authentication server computer 212 may send an authentication request message, via payment processing network computer 208, to a user mobile device 214, e.g., a mobile phone, to request that user 202 send an image of him, via user mobile device 214. The authentication request message may be sent in-line using the same channel that is used to conduct the transaction, or using an out-of-band communication channel such as a wireless carrier. After identification and authentication server computer 212 receives the image from user 202, the image may be compared to the image on file to determine that user 202 requesting approval of the payment transaction is the official account holder. The image may be sent from the user 202 to identification and authentication server computer 212 by using an authentication response message. If the received image matches the image on file, identification and authentication server computer 212 may send a message to payment processing network computer 208 indicating that user 202 has been identified and authenticated. In response to the results, payment processing network computer 208 may then forward the payment authorization request message to the issuer computer 210 to continue to process the transaction. Prior to sending the payment authorization request message to the issuer computer, payment processing network computer 208 may modify the originally received payment authorization response message to provide an authentication score, which indicates the likelihood that user 202 is the authentic user. The authentication score can be embodied as a standalone score, or may be incorporated into a general risk score that scores the likelihood that the transaction is authentic. A general risk score can be based on a number of other factors including the particular merchant that is conducting the transaction, the amount of the purchase, the location of the purchase, etc. The authentication score or risk score could be in the form of any quantitative value (e.g., a number from 1 to 10, with 1 being the lowest risk and 10 being the highest).

Thus, as described above, in some embodiments, payment processing network computer 208 may include the identification and authentication results in the payment authorization request message sent to issuer computer 210. In some embodiments, instead of payment processing network computer 208, issuer computer 210 may communicate with identification and authentication server computer 212 to confirm the identity and authenticate the user after receiving the payment authorization request message from payment processing network computer 208.

In some embodiments, sending an out-of-band authentication request message to user 202 to request additional information may be advantageous. For example, the user's credit card may have been stolen, but he may not realize it. If another person tries to use the credit card, the user may receive the authentication request message on his mobile device indicating the transaction details and requesting that he send a self-photograph in order to process the transaction. This offers several advantages. First, it will alert the user that someone else is trying to use his credit card. The user may then call his issuer and cancel the card thus limiting the exposure for himself and his issuer. Second, since the person attempting to use the credit card will not receive the message about sending a photograph, identification and authentication server computer 212 will not receive a photograph and thus the identification will fail consequently resulting in denial of the transaction and/or the transaction timing out without approval. Thus, the criminal trying to use the user's payment device will not be able to perpetrate the fraud and moreover he will have no idea why the transaction was denied, thus depriving him of the opportunity to fix his mistakes.

In other embodiments of the invention, instead of sending an payment authorization request message from access device 204 to payment processing network computer 208 and then sending the authentication request message to user 202, it is possible to include a photo, video, or accelerometer data directly to access device 204 before or shortly after the payment authorization response message is initially generated. The photo, video, or accelerometer data can be used as a verification token, which verifies user 202. This token can be compared with photo, video, or accelerometer data in a database at any suitable location (e.g., in the payment processing network). In such embodiments, an authentication request message need not be generated. The photo, video, or accelerometer data can simply be used as an authentication token.

As discussed above, identification and authentication server computer 212 matches the received image with the image on file to determine the identity of user 202. Any known image/face recognition techniques may be used to perform the comparison. In some embodiments, in addition to or in lieu of the face, other attributes of the person such as eye color, skin, etc., can be used to perform the matching. The level and complexity of the matching process can be programmed based on the requirements.

Even though identification and authentication server computer 212 is shown as a separate block in FIG. 2, in some embodiments, identification and authentication server computer 212 may be part of payment processing network computer 208 or issuer computer 210. In other embodiments, identification and authentication server computer 212 may be a separate entity.

Figure 2A:
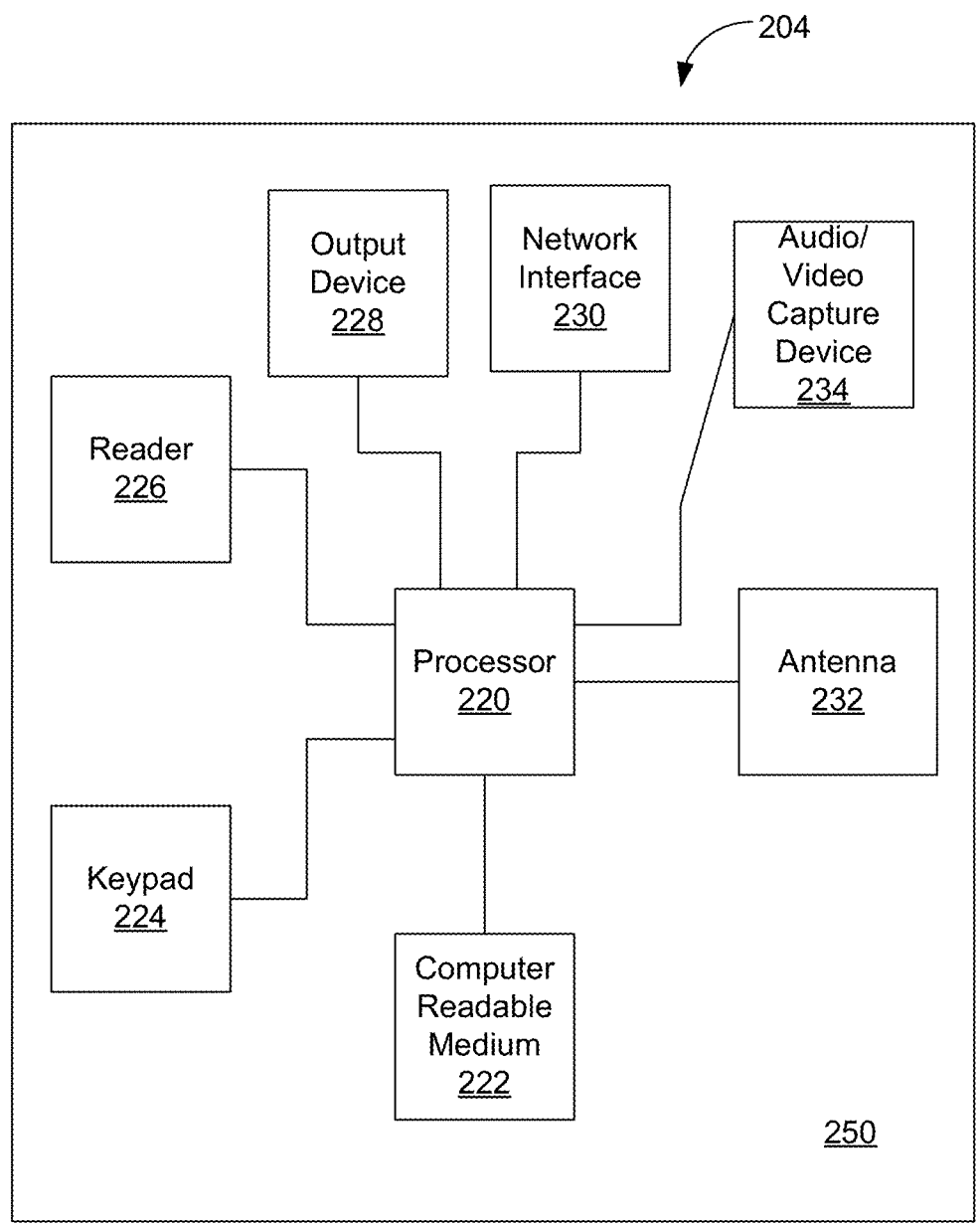
FIG. 2A is a block diagram of an access device according to an embodiment of the present invention.

FIG. 2A is a block diagram of the basic components that may reside in an exemplary access device 204, according to an embodiment of the present invention. Access device 204 may comprise a processor 220. It may also comprise computer readable media (CRM) 222, a keypad 224, a magnetic strip reader 226, an output device 228, a network interface 230, an antenna 232, and an audio/video capture device 234. All of these elements may be operatively coupled to processor 220. A housing 250 may house one or more of these components.

CRM 222 may include one or more memory chips, disk drives, etc. CRM 222 may store code or instructions for allowing access device 204 to operate in the manner described herein. The instructions may be executed by processor 220.

CRM 222, or memory, may further comprise any suitable code. The code may be suitable to cause processor 220 to perform any or all of the functionality of access device 204 as described herein. In some embodiments, CRM 222, or memory, comprises: (a) code for receiving information from user mobile device 214; (b) code for sending information to user mobile device 214; (c) code for receiving information from user 202; (d) code for sending information to user 202; (e) code for sending information to merchant acquirer computer 206; (f) code for sending information to payment processing network computer 208; (g) code for sending information to issuer computer 210; (h) code for receiving information from acquirer computer 206; (i) code for receiving information from processing network computer 208; (j) code for receiving image/audio/video information from audio/video capture device 234; and/or (j) code for receiving information from issuer computer 210.

Keypad 224 may be operable to input information such as transaction information into access device 204. Magnetic strip reader 226 may be operable to read information from a magnetic strip of a card such as a credit card or a debit card. Output device 228 may include a display. The display may display, for example, transaction information. Network interface 230 may be operable to enable access device 204 to communicate with other system entities. For example, it may enable access device 204 to communicate with one or more of acquirer computer 206, payment processing network computer 208, and issuer computer 210. Antenna 232 may be provided to enable access device 204 to operate remotely using a wireless communication medium. Audio/video capture device 234 may include a camera, a microphone, etc. that is configured to capture audio, video, or still image of a user who is conducting a transaction using access device 204. In some embodiments, audio/video capture device 234 may be part of access device 204. In other embodiments, audio/video capture device 234 may be external to access device 204 and operatively coupled to access device 204 and in some embodiments may be controlled by access device 204.

In some embodiments, audio/video capture device 234, e.g., a camera, mounted at or near access device 204 and coupled to access device 204 may automatically capture the image of the person attempting to use a payment device for a transaction and send that information along with the payment authorization request message to payment processing network computer 208, which may be then forwarded to identification and authentication server computer 212. If the image of the person does not match the image on file for the account holder, identification and authentication server computer 212 may save the image and mark the image as being that of a potential criminal. Thereafter, every time a match between a received image and an image on file fails, the received image may be compared to a database of such images, potentially of a criminal, to determine a match. In this manner, it may be possible to determine repeat offenders and build a profile for these offenders to help law enforcement track and catch these criminals.

Figure 2B:
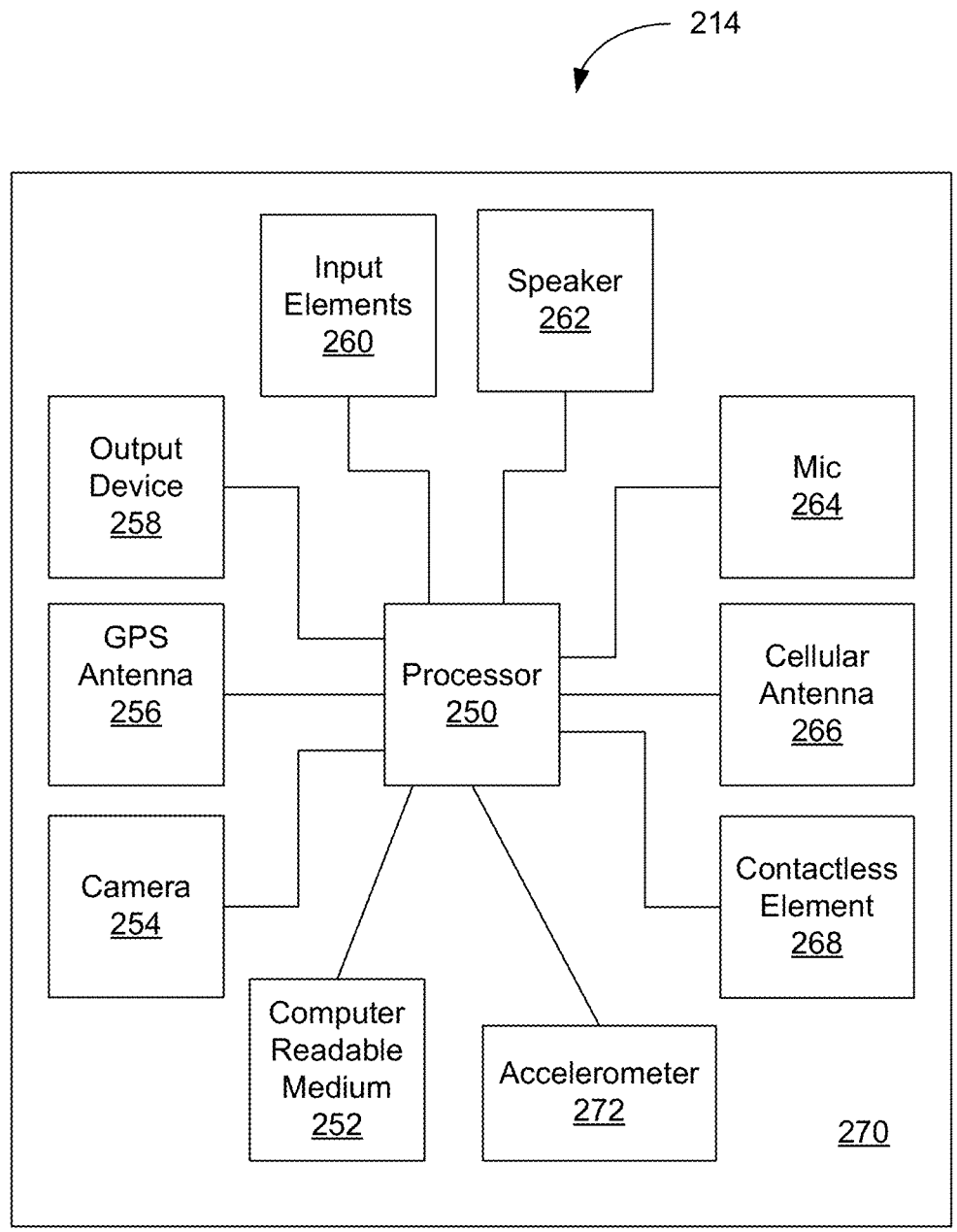
FIG. 2B is a block diagram of a mobile device according to an embodiment of the present invention.

FIG. 2B is a block diagram of the basic components that may reside in an exemplary user mobile device 214, e.g., a mobile phone, according to an embodiment of the present invention. User mobile device 214 comprises a computer readable medium (CRM) 252. CRM 252 may be present within a body 270, or may be detachable from it. Body 270 may be in the form a plastic substrate, housing, or other structure. CRM 252 may be a memory that stores data and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, bank identification number (BIN), credit or debit card number information, account balance information, expiration date, user information such as name, date of birth, etc. Any of this information may be transmitted by user mobile device 214.

CRM 252, or memory, may further comprise any suitable code. The code may be suitable to perform any or all of the functionality of user mobile device 214 as described herein. In some embodiments, CRM 214, or memory, comprises: (a) code for receiving information from access device 204; (b) code for sending information to access device 204; (c) code for sending information to issuer computer 210; (d) code for sending information to payment processing network computer 208; (e) code for receiving information from payment processing network computer 208; and/or (f) code for receiving information from issuer computer 210.

User mobile device 214 also comprises a camera 254. Camera 254 is operable to take pictures (i.e., acquire images), video, etc. and may include any type of image-acquiring device known in the art. User mobile device 214 may also comprise a GPS antenna 256. GPS antenna 256 is operable to receive transmissions from GPS satellites for identifying a location of user mobile device 214. GPS antenna 256 may include any type of antenna operable to receive transmissions from GPS satellites as is known in the art.

User mobile device 214 may also comprise other elements typically included in user mobile devices. For example, user mobile device 214 may also include a processor 250 (e.g., a microprocessor) for processing the functions of the user mobile device 214 and an output device 258 (e.g., an electronic display) to allow a user to see phone numbers and other information and messages, e.g., authentication request message. User mobile device 214 may further include input elements 260 to allow a user to input information into the device, a speaker 262 to allow the user to hear voice communication, music, etc., and a microphone 264 to allow the user to transmit his/her voice through user mobile device 214. User mobile device 214 may also include a cellular antenna 266 for wireless voice and data transfer (e.g., voice and data transmission). User mobile device 214 may also include a contactless element 268, which is typically implemented in the form of a semiconductor chip (or other data storage element) with an associated wireless transfer (e.g., data transmission) element, such as an antenna. Contactless element 268 functions to permit the exchange of data and/or control instructions between user mobile device 214 and an optional contactless element included in a merchant access device.

User mobile device 214 may also include an accelerometer 272. Accelerometer 272 is typically implemented in the form of an integrated circuit chip. Accelerometer 272 can measure the proper acceleration of user mobile device 214 as it is being held and used by user 202. In some embodiments, accelerometer 272 can be a multi-axis accelerometer. As discussed below, each person generates a unique accelerometer signature based on his/her body movements. Thus, when a user holds user mobile device 214 in his/her hands and captures an image or video, the movement of the user's hand generates accelerometer readings that are unique to the user and are hard to recreate by another user. The accelerometer readings can be communicated to other external systems for further processing.

Although FIG. 2B shows a number of components, user mobile device 214 according to embodiments of the invention may comprise any suitable combination or subset of such components.

Figure 3:
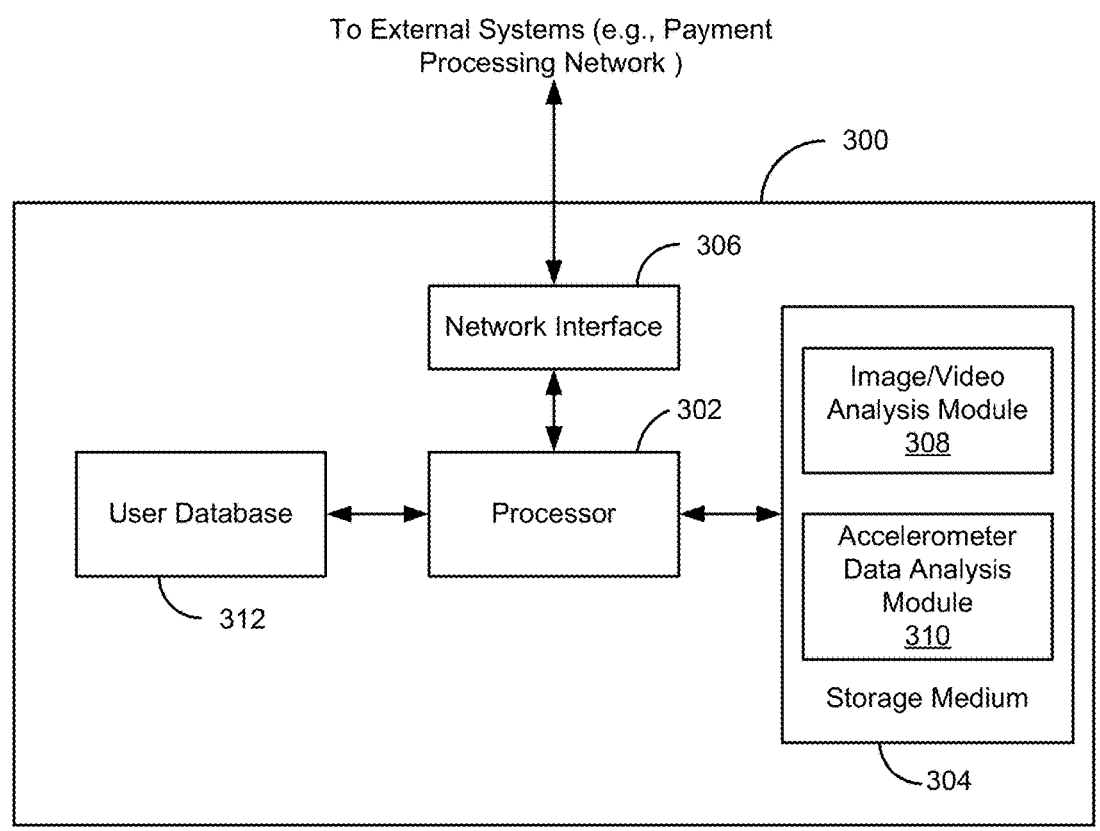
FIG. 3 is a functional block diagram of an identification and authentication server computer according to an embodiment of the present invention.

FIG. 3 is a functional block diagram of an identification and authentication server computer 300 according to an embodiment of the present invention. Identification and authentication server computer 300 includes a processor 302, storage medium 304, a network interface 306, an image/video analysis module 308, and an accelerometer data analysis module 310; and a user database 312.

Processor 302, which can be implemented as one or more integrated circuits (e.g., a conventional microprocessor or microcontroller), can control the operation of identification and authentication server computer 300. In various embodiments, processor 302 can execute a variety of programs in response to program code and can maintain multiple concurrently executing programs or processes. At any given time, some or all of the program code to be executed can be resident in processor 302 and/or in storage media such as storage medium 304.

Through suitable programming, processor 302 can provide various functionalities for identification and authentication server computer 300. For example, in response to a received image input, processor 302 can launch application programs, compare the received image to one or more stored images, perform identification of the user in the image, control network interface 306 to establish or terminate network connections or send and receive data and other signals, and so on.

Storage medium 304 can be implemented, e.g., using disk, flash memory, or any other non-volatile or non-transitory storage medium. In some embodiments, storage medium 304 can store program code to be executed by processor 302 (including application and operating-system programs). This code can include program code related to identifying and authenticating user as described below. Storage medium 304 can also store data such identification information for one or more users, accelerometer data, etc.

Network Interface 306 can provide data communication capability for identification and authentication server computer 300. In some embodiments interface 306 can include a wired interface such as Ethernet. In other embodiments, interface 306 can include radio frequency (RF) transceiver components for accessing wireless voice and/or data networks (e.g., using advanced data network technology such as 3G, 4G or EDGE, WiFi (IEEE 802.11 family standards), or other wireless communication technologies, or any combination thereof). Network interface 306 can be implemented using a combination of hardware (e.g., antennas, modulators/demodulators, encoders/decoders, and other analog and/or digital signal processing circuits) and software components.

Image/video analysis module 308 can include program code for analyzing images, video, and other related data to identify the user included in the image/video. In some embodiments, whenever user is issued a payment device, the user may be asked to submit an image/video of him/her as part of a registration process. This image/video may be stored in user database 312. Periodically, the user may be asked to submit an updated image/video to ensure that most current user data is available for analysis. In some embodiments, the image/video may include the face of the user. In other embodiments, the image/video may include other biometric information such as fingerprints, eye color, etc. In some embodiments, when identification and authentication server computer 300 receives an image/video of a user, image/video analysis module 308 in conjunction with the processor analyzes the image/video and compares the information in the received image/video with information stored in user database 312 to determine whether the received image matches any image stored in user database 312. If a positive match is found, the data associated with the image is retrieved and compared to the data received from the person using the payment device. If the information matches, the user is authenticated and an authentication response message to that effect may be sent to the payment processing network computer 208 and/or the issuer computer 210.

In some embodiments, where the input is a video, image/video analysis module 308 may analyze the video to determine certain attributes of the person in the video. For example, the attributes may include, face, gestures, gait, biometric information etc. Image/video analysis module 308 may compare one or more of the attributes with information stored in storage medium 308 to determine the identity if the person in the video. If a match is found, image/video analysis module 308 may send an authentication confirmation message to the payment processing network computer 208 and/or the issuer computer 210 informing the payment processing network computer 208 of the results. In some embodiments, image/video analysis module 308 may be resident in storage medium 304 as a set of executable instructions/programs.

Accelerometer data analysis module 310 may include program code for extracting and analyzing accelerometer data associated with or embedded in a video, an image, or a series of images. In some embodiments, as part of the payment processing process, the user may be asked to submit a video of himself and/or a series of images of himself. As described above, a user mobile device includes an accelerometer. A payment (or other) application resident on the user's mobile device may capture accelerometer data (generated by the accelerometer) associated with the video and/or the series of images and send the accelerometer data along with the video/series of images to identification and authentication server computer 300. In some embodiments, the video or series of images may be "digitally signed" with the accelerometer data. Identification and authentication server computer 300 may be programmed to extract the accelerometer information and compare that to accelerometer information stored in user database 312. In some embodiments, accelerometer data analysis module 310 may be part of storage medium 304.

An accelerometer measures proper acceleration, which is the acceleration it experiences relative to free fall and is the acceleration felt by people and objects. In other words, at any point in space-time the equivalence principle guarantees the existence of a local inertial frame, and an accelerometer measures the acceleration relative to that frame. Such accelerations are popularly measured in terms of g-force. Every person generates unique accelerometer data based on his/her hand and body movement. Such accelerometer data is hard to replicate for another user and is almost as unique as DNA or a fingerprint. Many user devices, such as mobile phones, now have built in accelerometers that can be used to gather accelerometer data as the user is capturing a video. In some embodiments, even if the video can be replicated, it would be hard, if not impossible, to replicate the shaking of a person's hand who captured the video. Thus, accelerometer data can be useful in confirming an identity of a person and may provide another level of security against tampering and manipulation.

Figure 4:
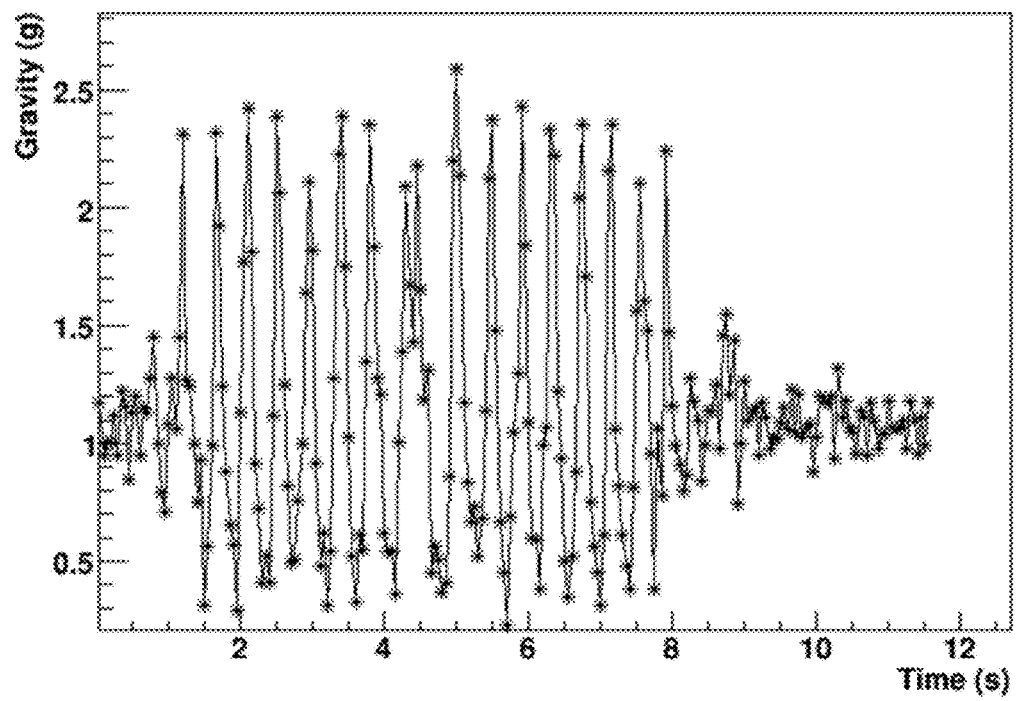
FIG. 4 illustrates sample accelerometer data associated with the running motion of a person.

FIG. 4 illustrates sample accelerometer data generated by a person who is running. The data shows the g-force experienced by the accelerometer on the person as the person is running. Each person generates unique accelerometer data based on the motion pattern of the person. Thus, another person running is unlikely to generate the same data as shown in FIG. 4. Thus, even though the "running" can be replicated, the accelerometer data associated with the running cannot be replicated. In some embodiments, as part of the registration process the user may be asked to submit video of him/her taken on a device that has accelerometer. Once the video is received by identification and authentication server computer 300, the accelerometer data can be extracted from the video and stored, e.g., in user database 312, and associated with the user. Thereafter, when a video is received from a user, accelerometer data may be extracted from the newly received video and compared to accelerometer data previously stored for the user to determine whether the user who sent the newly received video is the same user as registered previously. In some embodiments, any know methods for accelerometer data comparison may be used to perform the analysis, e.g., reduction algorithms.

A sample code segment for performing the comparison between a stored video and video received from the user during the transaction processing is provided below. In general, as disclosed in the code segment below, a video received from the user, e.g., from the point of sale location, is compare to a video for the account number stored in the database. In some embodiments, certain attributes from the received video such as eye locations, face location, eye and face movements etc. are compared to similar attributes in the stored video and a score is determined for each of these attributes. Thereafter a combined score is generated for the received video by combining the individual scores. Based on the combined score, a determination can be made whether the person in the received video is same as the person in the stored video. In some embodiments, the combined score can be a numerical value ranging from 0 to 100 with a lower score indicating that the person in the received video is likely not the same as the person in the stored video and high score indicating that the person in the received video is likely the same as the person in the stored video. It is to be noted the code disclosed below is for illustrative purposes only. Similar code can be used to perform the image comparison and the accelerometer data comparison.

```python
#!/usr/bin/env python
import sys
import vEG          # Standard Quantum Encrypted General Library E.G.
import vEG3d        # Mesh upgrade stuff of EG
import vDataRAM # memory cache interface abstraction
voiceInNetworkSNR = .9
voiceOutNetworkSNR =.9
accelNetworkSNR = .5
imageInNetworkSNR = 3
imageNegNetworkSNR = 1
Def AuthenticateImageProcessing(network, video):
    if calculateWatermark(video,network) == 0)
        return 0
    background = buildBackground3d(video)
```

```
    face = buildFace3d(video)
    backgroundMovement = CalculateBackgroundMovement(background)
    eyeMovement = CalculateEyeMovement(face)
    faceMovement = CalculateFaceMovement(face)
    mixedMovement = CalculateMixedMovement(video)
    movementScore =
ScoreMovement(backgroundMovement,EyeMovement,faceMovement,mixedMovement)
    geoContextScore = MatchToGeoContext(video)
    finalScore = ScoreAll(movementScore,geoContextScore)
    return finalScore
Def AuthenticateImage(networkTrans, video):
    isImageReal = AuthenticateImageProcessing(networkTrans[0], video):
    if isImageReal < .9:
        return 0
    networkImages = pullImagesInNetwork( networkTrans)
    inNetworkScore = ScoreImages(networkImages,networkTrans[1])
    networkImageCluster = ClusterInNetwork(networkImages,networkTrans[1])
    outNetworkImageRangeList = PullImagesOutNetwork(networkImageCluster)
    outNetworkScore =
ScoreImagesRangeList(outNetworkImageRangeList,networkTrans[1])
    return inNetworkScore, outNetworkScore
Def AuthenticateVoiceToken(networkTrans, video):
    if calculateSoundWatermark(networkTrans[3]) == 0)
        return 0
    wordPhenToken = BuildPhoneticGroups(networkTrans[2])
    mouthMovement = BuildMouth3d(video)
    scorePhenMovement = MatchPhenToMovement(wordPhenToken,mouthMovement)
Def AuthenticateVoiceBackground(networkTrans, video):
    background = removeForegroundSound(networkTrans[3])
    getSoundContext = pullRamDBGEO(networkTrans)
    backgroundSoundScore = ScoreSoundToContext(background,getSoundContext)
    return backgroundSoundScore
Def AuthenticateBodyMovement(networkTrans, video,egModel):
    if checkIfUsesWave(networkTrans) == 0)
        return 1
    waveGraph = calculateWaveGraph(video)
    waveGraphScore = ScoreWave(networkTrans,waveGraph)
    return waveGraph
Def ScoreAll(networkTrans,video,egModel):
    s1 ,s2 = AuthenticateImage(networkTrans, video)
    if s1 < .9 :
        return 0
    if s2 > .9 :
        return −1
    s3 = AuthenticateVoiceToken(networkTrans, video)
    s4 = AuthenticateVoiceBackground(networkTrans, video)
    s5 = AuthenticateBodyMovement(networkTrans, video)
    egScore = EG(egModel,[s1,s2,s3,s4],networkTrans)
    return egScore
```

Further, while identification and authentication server computer 300 has been described with reference to particular blocks as shown in FIG. 3, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including server computers implemented using any combination of circuitry and software.

In a particular embodiment, image/video analysis module 308 may be hosted by a server computer that is separate from identification and authentication server computer 300 and they both may work in conjunction with each other to perform the authentication and payment authorization. For example, in the instance of a cross-border transaction, the sending and/or the receiving country may have certain privacy laws that might prohibit certain personal information, e.g., an image of a person, about a sender or receiver to be transmitted outside the country. In such instances, the image/video/audio etc. analysis may be performed locally within the origination country or the destination country for the transaction. The results of the image/video/audio analysis may be provided to identification and authentication server computer 300, which can either be located in the origination country or the destination country. Based on the results provided, identification and authentication server computer 300 may then proceed to approve or deny the transaction as described above.

Figure 5:
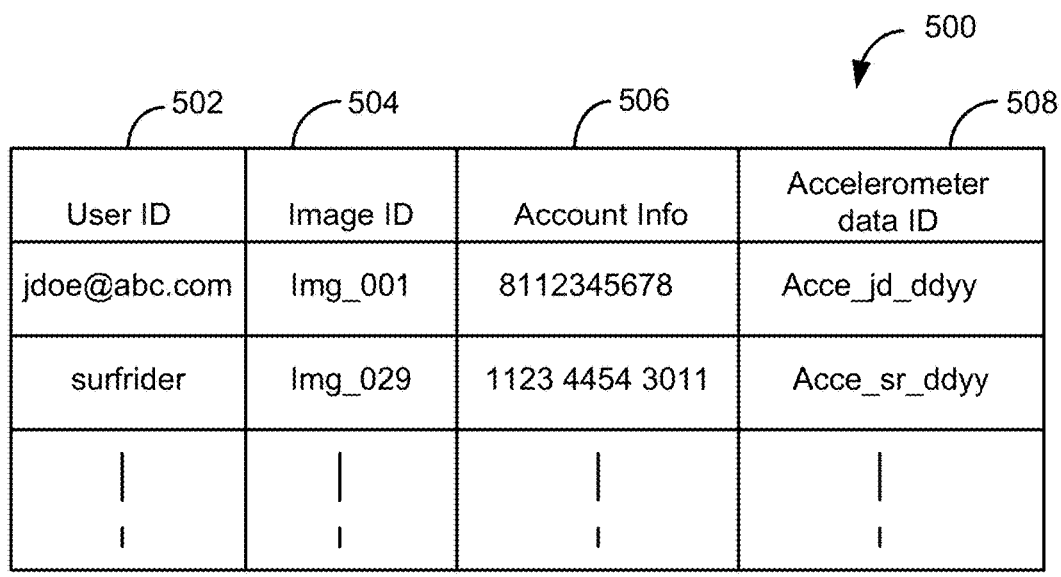
FIG. 5 is a table illustrating data stored in the identification and authentication server according to an embodiment of the present invention.

As discussed above storage medium 304 may include information about a user including an image/video of the user. In some embodiments, this information may be stored in a user database 312. In some embodiments, user database 312 may be included in storage medium 304. In other embodiments, user database 312 may be separate from storage medium 304. FIG. 5 illustrates a table 500 that may be stored in user database 312 of identification and authentication server computer 300 according to an embodiment of the present invention. It is to be understood that table 500 is an exemplary manner in which user information may be stored. One skilled in the art will realize that in other embodiments, more or less information than illustrated in table 500 may be stored.

Table 500 may include a user ID 502, an image ID 504, user payment account information 506, and accelerometer data 508. User ID 502 may include an identifier for the user, e.g., an alias. An "alias" may be used to uniquely identify a user. In some embodiments, an "alias" may be an alphanumeric value, such as a username, and may be static or dynamic. In some embodiments, an alias may also comprise of Unicode characters or other CJK (Chinese, Japanese, Korean) characters. In some embodiments, an alias may be associated with one or more portable user devices or user accounts.

Image ID 504 may include an identifier, e.g., file name, of an image/video associated with the user. This stored image/video may be used by identification and authentication server computer 300 to compare with the received image/video in order to identify the person in the received image/video during the payment processing process. Account information 506 may include a personal account number (PAN) associated with the payment device. In some embodiments, a user may possess several payment devices. All his payment devices can be associated with a single user ID for that user. In some embodiments, account information 506 may include additional information associated with the payment device. Accelerometer data 508 may include raw accelerometer data associated with the user. As described above, the accelerometer data 508 may be captured when the user captures an image/video of him as part of the initial registration process. In some embodiments, accelerometer data 508 may be periodically updated to capture the most current accelerometer readings for the user. For instance, with age a user's "hand shaking" pattern may change. Thus having the most current accelerometer information will ensure that genuine transactions by the user are not denied due to data matching failure.

Of course one skilled in the art will realize in some instances a perfect match may not be found between images/videos on file and the received images/videos due to the inherent inaccuracies of the image/video matching algorithms. Hence, the system may include an error margin that may be defined during system configuration to ensure low false negatives during the matching process. The same is true for the process of matching accelerometer data. Therefore, as long as the image/video and/or the accelerometer data matching results are within the margin of error, the identification and authentication server computer may indicate a positive match. The value for the error margin may depend on the accuracy level of the particular algorithm used for the matching and may be periodically updated to reflect the level of current sophistication in the algorithms.

Figure 6:
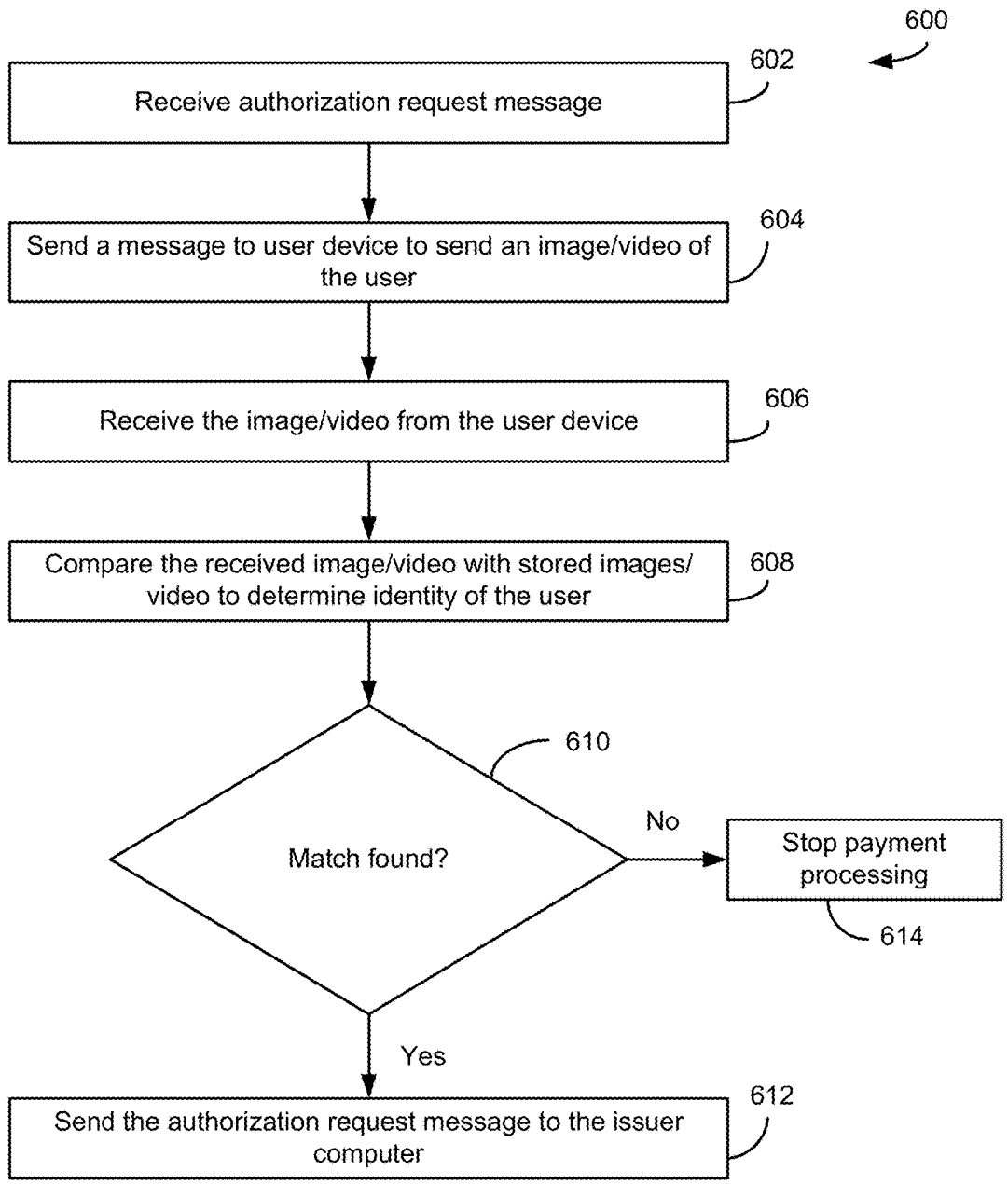
FIG. 6 is a flow diagram of a process for processing a payment transaction according to an embodiment of the present invention.

As mentioned above, images and/or video may be used to identify and authenticate a user before processing a payment processing transaction. FIG. 6 is a flow diagram of a process 600 for processing a payment transaction according to an embodiment of the present invention. Process 600 may be performed by, e.g., payment processing network computer 208 of FIG. 2. In this embodiment, the identification and authentication server computer and payment processing network computer are implemented in a single computer server.

A user 202 may visit a merchant and after selecting an item for purchase and may present a payment device at an access device 204, to pay for the item. Access device 204 may determine payment related information from the payment device and send a payment authorization request message to a merchant acquirer computer 206 associated with the merchant. The payment processing network computer 208 may receive the payment authorization request message from the merchant acquirer computer 206 (S602). The payment processing network computer 208 may send an authentication request message to a mobile device 214 of the user and request that the user send a photograph/video of himself, e.g., at the point of transaction (S604). The payment processing network computer 208 may receive the image/video (S606). Thereafter, the payment processing network computer 208 may compare the image/video with the previously stored images/videos to determine a match (S608). The payment processing network computer 208 may determine whether there is a match and if so whether it is within the margin of error (S610). If the match is within the margin or error, the payment processing network computer 208 may conclude that the received image/video is of the user who is the authorized account holder for the payment device and send that information to an issuer of the payment device (S612). If a match is not found, the payment processing network computer 208 may stop further processing of the payment request and send a message to that effect to access device 204 for presentation to the user (S614).

It will be appreciated that process 600 described herein is illustrative and that variations and modifications are possible. Acts described as sequential can be executed in parallel, order of acts can be varied, and acts can be modified or combined. For instance, in some embodiments, if a match is not found but the results are slightly, e.g., 5%, outside the margin of error, the payment processing network computer 208 may request the user to send another image/video. Such situations can occur if the lighting conditions associated with the received image are such that it is hard to make a positive match but at the same time the person in received image is not that different from the person in the stored image. In other embodiments, under such "close call" situations, the payment processing network computer 208 may perform another level of matching, e.g., accelerometer data matching described below, to further determine the identity of the user. In some embodiments, where the payment processing network computer 208 and identification and authentication server computer 212 are implemented as separate entities, steps 602 and 604 may be performed by the payment processing network computer 208 and at step 612, identification and authentication server computer 212 may send the results of the matching to the payment processing network computer 208 instead of the issuer.

Figure 7A:
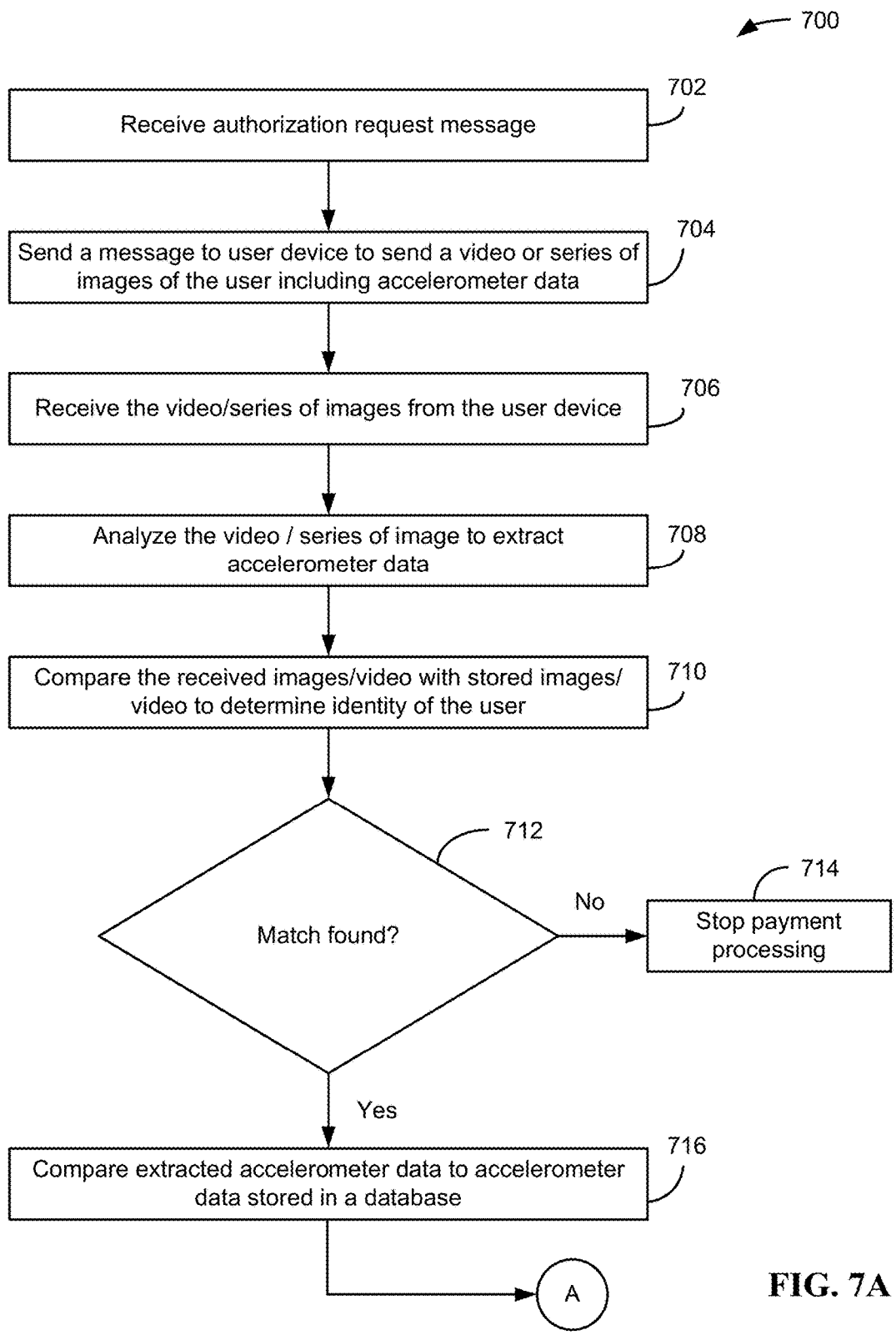
FIGS. 7A and 7B is a flow diagram of a process for processing a payment transaction according to another embodiment of the present invention.
Figure 7B:
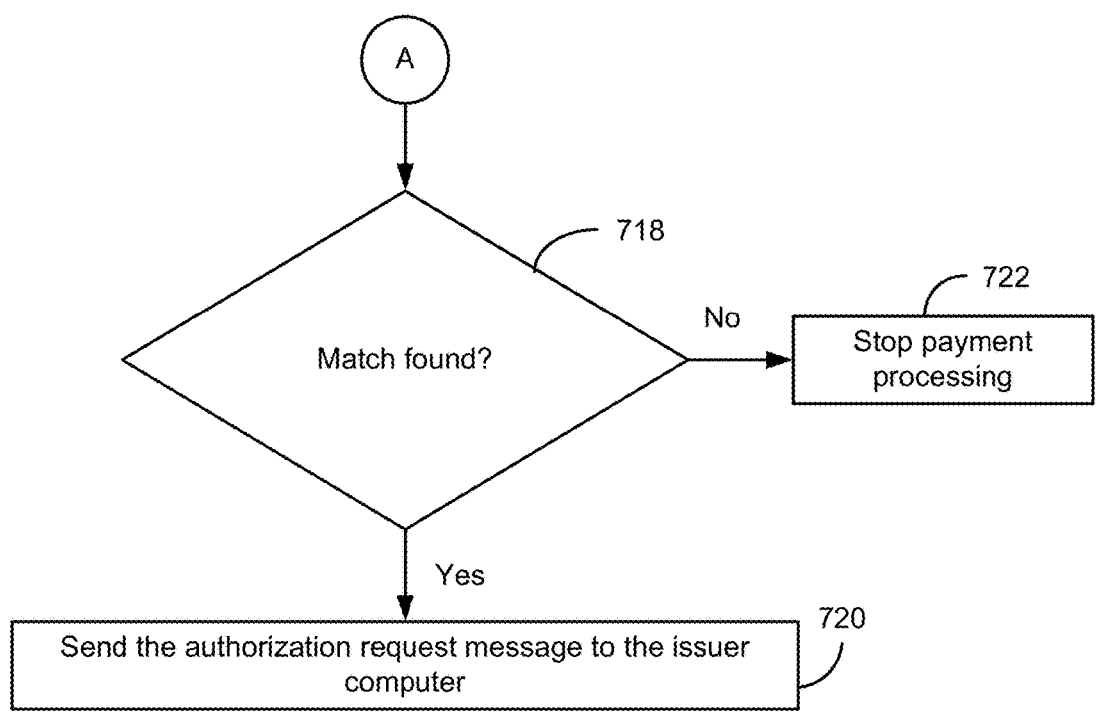

In some embodiments, instead of or in addition to image/video comparison, the identification and authentication server computer may also perform accelerometer data comparison to determine the identity of the person currently using a payment device to pay for a transaction. FIGS. 7A and 7B are flow diagrams of a process 700 for processing a payment transaction according to an embodiment of the present invention. Process 700 may be performed by, e.g., payment processing network computer 206 of FIG. 2. In this embodiment, the identification and authentication server computer and payment processing network are implemented in a single computer server.

After a user presents a payment device to pay for his purchase, access device 204 at the merchant location may send a payment authorization request message to an acquirer associated with a merchant. As illustrated in FIG. 7A, the payment processing network computer 206 may receive the payment authorization request message from the acquirer computer (Step 702). Thereafter, payment processing network computer 208 may communicate with user 202, e.g., via the user's mobile device 214, and request that user 202 send a video and/or a series of images captured within a specified time, e.g., 10 seconds (Step 704). The payment processing network computer 208 may receive the video and/or series of images from user mobile device 214 (Step 706). Thereafter payment processing network computer 208 may extract the accelerometer information associated with the video and/or accelerometer data between the times of capturing each image in the series of images (Step 708). Payment processing network computer 208 may compare one or more attributes of the person depicted in the video/series of images with the stored video/image of the user associated with the payment device (Step 710).

If the attributes of the person in the received video/series of images do not match the attributes of the user associated with the payment device (Step 712), further processing of the transaction is stopped (Step 714) and a message to that effect may be sent to access device 204 for display to the person. In some embodiments, the received video/images may be stored for future use. If the attributes of the person in the received video/series of images matches the attributes of the user associated with the payment device (Step 712), the payment processing network computer 208 may then analyze the accelerometer data associated with the video/series of images to determine whether the received accelerometer data matches the accelerometer data on file for the user associated with the payment device (Step 716). As illustrated in FIG. 7B, if the accelerometer data associated with the received video/series of images matches the accelerometer data on file for the user associated with the payment device (Step 718), the payment processing network computer 208 may conclude that the person currently using the payment device is the user associated with the payment device and send the payment authorization request message to the issuer of the payment device (Step 720). The rest of payment processing can then proceed according to the conventional process. If the accelerometer data does not match, the payment processing network computer 208 may conclude that the video/series of images were not captured by the user associated with the payment device and send this information to the issuer computer (Step 722).

Thereafter the payment processing network computer 208 may also communicate any approval/denial messages from issuer computer 210 to access device 204. In some embodiments, payment processing network computer 208 may include a recommendation, based on the matching process, in the payment authorization request message sent to issuer computer 210. The recommendation may be to approve or deny the payment based on the matching results. However, the issuer is under no obligation of act on the recommendation or based on the results of the matching. In some embodiments, the issuer may ignore the results of the matching and independently take a decision to approve or deny the transaction. Thus, it may be possible that the issuer may deny payment for a transaction even when a positive match is found and approve payment for a transaction when a match is not found (i.e. identity of the user cannot be confirmed).

It will be appreciated that process 700 described herein is illustrative and that variations and modifications are possible. Acts described as sequential can be executed in parallel, order of acts can be varied, and acts can be modified or combined. For instance, in embodiments where the payment processing network computer 208 and identification and authentication server computer 212 are implemented as separate entities, steps 702 and 704, 714, and 720 may be performed by payment processing network computer 208 and the rest of the steps may be performed by identification and authentication server computer 212.

In some embodiments, some portions of identification and authentication server computer 212 may be implemented at merchant location. For example, image/video analysis module 308 and/or accelerometer data analysis module 310 can be located at a merchant location. In this embodiment, user database 312 may be implemented remotely from the merchant location and communicably coupled with image/video analysis module 308 and accelerometer data analysis module 310. Thus, in this instance, an image sensor located at the merchant site may capture an image/video of the person who presents the payment device for purchase of an item. The image/video may be stored locally at the merchant site. Image/video analysis module 308 may communicate with an external server hosting user database 312 and in conjunction with the external server, perform the image/video analysis to determine the identity of the person in the image/video.

In some embodiments, an image, a video, or audio of a user may be used to present the user with targeted advertising and marketing information in addition to or in lieu of using the information for payment authorization.

Figure 8:
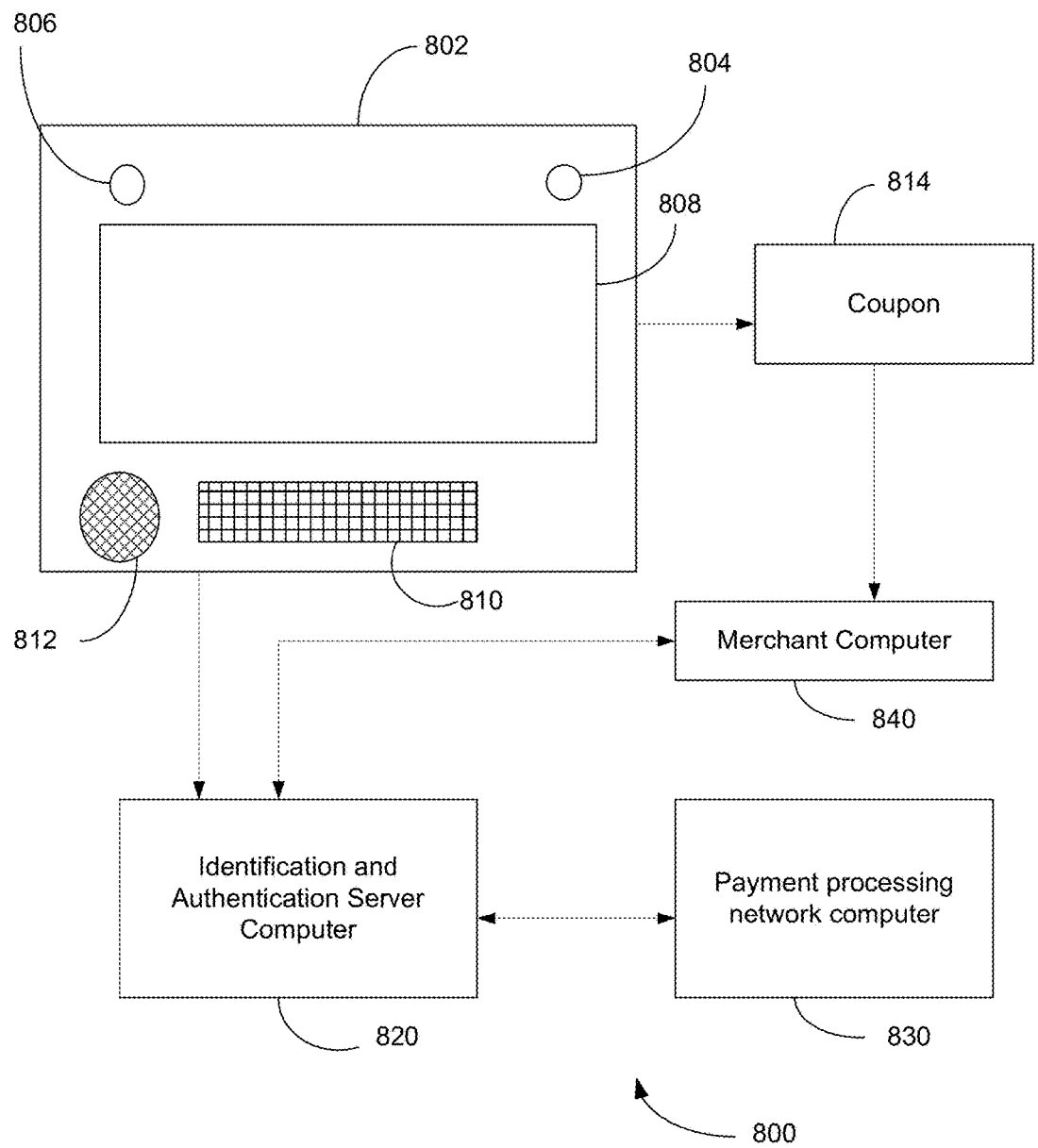
FIG. 8 is a block diagram of a system for disbursing and using coupons according to an embodiment of the present invention.

FIG. 8 is a block diagram of a system 800 according to an embodiment of the present invention. System 800 may include a kiosk 802. Kiosk 802 can include an image capture device 804, an audio capture device 806, a display 808, a user input device 810, and an audio output device 812.

Image capture device 804 may be a camera, a CCD, or any other device capable of capturing still and/or video images. Audio capture device 806 may be implemented as a microphone. Display 808 can be a touch screen or any other conventional display. User input device 810 can be a keyboard, touch pad, scroll wheel, click wheel, dial, button, switch, keypad, or the like. Audio output device may include a speaker. Audio output device 812 can be a speaker or the like. System 800 may also include identification and authentication server computer 820 and a payment processing network 830, similar to the ones discussed in FIG. 3 above.

In an embodiment, a user may approach kiosk 802 and inquire about any available coupons for one or more merchants proximal to the location of kiosk. For example, kiosk 802 may be located in a shopping mall and kiosk 802 may provide one or more coupons 814 that may be used at merchants located in the shopping mall. Each coupon 814 may have a unique coupon identifier (ID) associated with it in order to properly track the coupon. The user may either type in his query, e.g., using user input device 810 or "speak" is his query to the kiosk, e.g., via audio capture device 806. Kiosk 802 may present the user with one or more coupons based on the received query. In some embodiments, where the user speaks his query to kiosk 802, the kiosk may store a portion of the users audio input and link it to coupon(s) 814 presented to the user, e.g., by linking the audio to the coupon ID for coupon 814. In other embodiments, kiosk may 802 may also capture an image of the user and link the image to the coupon ID. Kiosk 802 may send the association information between the image/audio of the user and coupon 814 to identification and authentication server computer 820. Thus, kiosk 802 may create association information between the one or more coupons 814 presented to the user and some unique identifying attributes of the user such as audio/video/image of the user. Once kiosk 802 captures user information, it may send this information to identification and authentication server computer 820, which may automatically create a profile for the user using the received information and enroll the user in any available loyalty or rewards program associated with the one or more coupons.

In some embodiments, the user need not speak or enter his query into kiosk 802. As the user approaches kiosk 802, the kiosk can capture an image of the user and present a list of coupons without the user even asking for the coupons. In some embodiments, the user may print out the coupons or download them onto his mobile device.

Thereafter, the user may use coupon 814 for purchasing an item at merchant 840. When the user presents coupon 814 to the merchant, the merchant system may capture the user image, video, and/or audio along with the coupon ID and the payment device used by the user. This information may be communicated to identification and authentication server computer 820 for user authentication. Identification and authentication server computer 820 may verify whether coupon 814 was issued to the user based on information previously received from kiosk 802. For example, identification and authentication server computer 820 may compare the image of the user received from the merchant system to the image received from the kiosk along with coupon 814 to determine whether the user attempting to use coupon 814 is the same user to whom coupon 814 was originally issued. Once it is confirmed that coupon 814 was issued to the user attempting to use coupon 814, identification and authentication server computer 820 may approve the use of coupon and send the transaction details to payment processing network computer 830 for further processing. In addition, identification and authentication server computer 820 may also add the payment device details to the user profile. Once the transaction is completed, the loyalty and/or rewards for that transaction can be added to the user account.

From then onwards whenever the user shops at any merchant using any payment device, the user can be authenticated using audio/video/image of the user captured at the merchant location. Authentication may be performed by comparing the audio/video/image captured at the merchant location to information in the user profile, as discussed above. Any new information about the user obtained by identification and authentication server computer 820 can be automatically added to the user profile.

Figure 9:
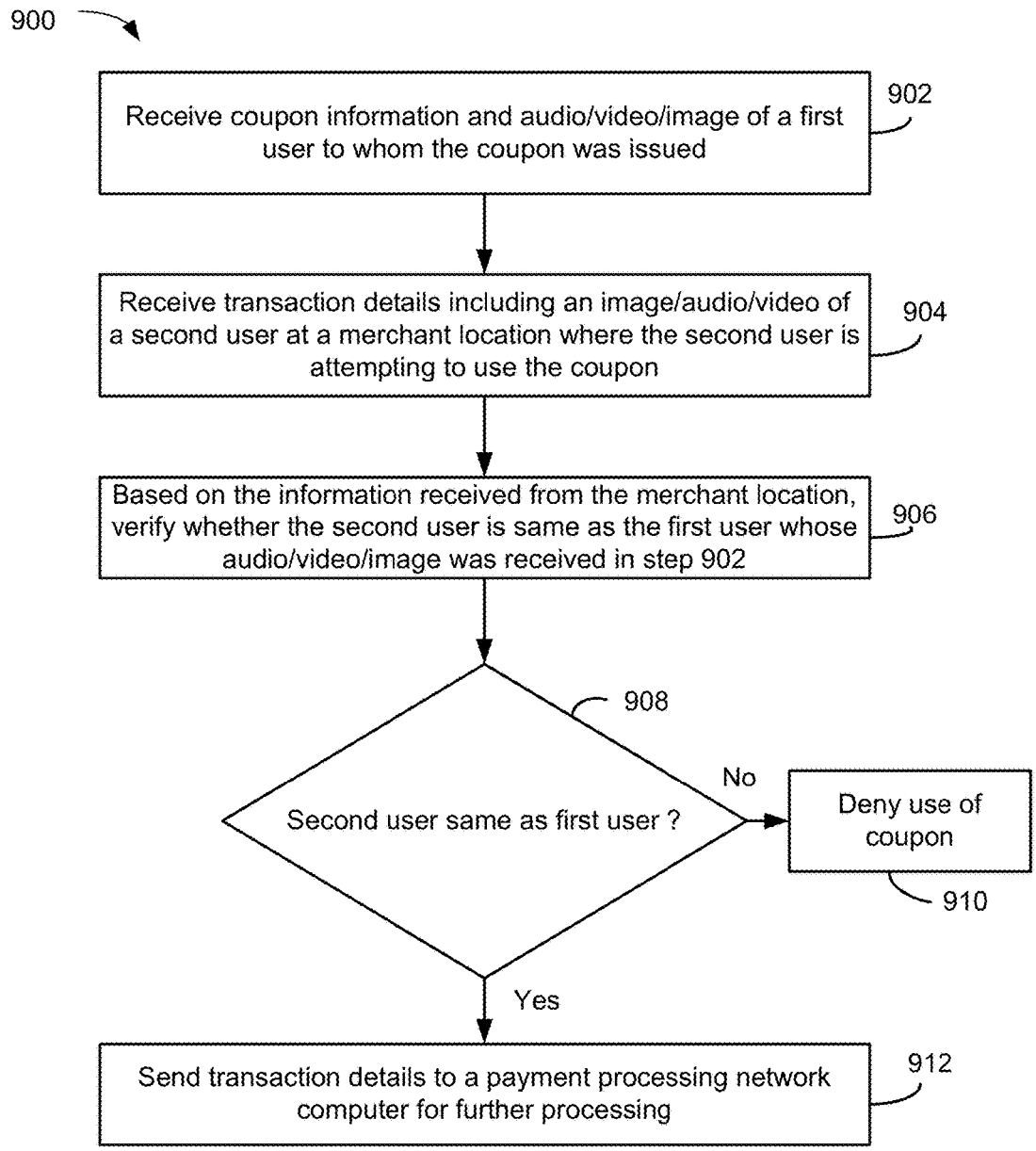
FIG. 9 is a flow diagram of a process for using a coupon according to an embodiment of the present invention.

FIG. 9 is a flow diagram of a process 900 for accruing loyalty points according to an embodiment of the present invention. Process 900 can be performed, e.g., the identification and authentication server computer 820 of FIG. 8.

A user may present himself to kiosk 802 and receive coupon 814 from kiosk 802. Subsequently, the user may use the coupon 814 to purchase an item that is the subject of the coupon. During the disbursement of the coupon 814, the kiosk 802 may capture audio/video/image of the user. The identification and authentication server computer 820 may receive this information along with a coupon ID associated with the coupon and store that information in a user database (Step 902). Thereafter, the user may then present the coupon to a merchant 840 along with a payment device to pay for the item to be purchased using the coupon 814. As discussed above, the user may be asked to send an image/video/or audio of him/her at the merchant location. In some embodiments, the requested information may be automatically captured at the merchant location. The identification and authentication server computer 820 may receive the image/video/audio of the user along with the transaction details (Step 904). The transaction details may include the coupon ID and details of the payment device, in addition to other transaction related information. The identification and authentication server computer 820 may verify that the user in the received image/video/audio is same as the user to whom the coupon was originally issued (Step 906).

In an embodiment, the identification and authentication server computer 820 may compare the coupon ID and the received user image/video/audio received in step 904 to the coupon 814 and user information received in step 902 to perform the verification. If it is determined that that the user in the received image/audio/video is the same as the user to whom the coupon 814 was originally issued (Step 908), the identification and authentication server computer 820 may authorize use of the coupon and send the transaction details to a payment processing network computer 830 for further processing (Step 912). If it is determined that the user in the received image/audio/video is not the same as the user to whom the coupon 814 was originally issued, the identification and authentication server computer 820 may deny use of the coupon (Step 910).

In some embodiments, the identification and authentication server computer 820 may create a user profile based on the information received from the kiosk. The user profile may include the coupon ID, user audio/video/image, and user payment device information, among other things. In addition, the user may also be enrolled in a loyalty/rewards program. In some embodiments, the identification and authentication server computer 820 may use a portion of the transaction details to update the loyalty/rewards program account for the user. Thereafter, whenever the user shops using a coupon, use a payment device used previously, or use a new payment device, the user can automatically accrue loyalty/rewards points. In addition, whenever the identification and authentication server computer 820 receives any new information about the user, e.g., new image, new payment device details, etc. that information is added to the user profile.

It will be appreciated that process 900 described herein is illustrative and that variations and modifications are possible. Acts described as sequential can be executed in parallel, order of acts can be varied, and acts can be modified or combined.

In some embodiments, the user may pre-register with identification and authentication server computer 820. During the registration process, the user may set one or more preferences for receiving coupons. For example, the user may specify certain merchants from whom he wishes to receive coupons; the user may specify the category of items for which he wants to receive the coupons, etc. In addition, the user may provide addition information to the identification and authentication server computer 820 during the registration process such as one or more payment device information, an image/video or audio sample, etc.

When an enrolled/registered user approaches a kiosk, the kiosk can capture an image/audio/video of the user and verify the identity of the user by consulting with the identification and authentication server computer 820. In some embodiments, the kiosk 802 may also play a personalized greeting for the user such as "Hello Mr. Smith" based on the identification. Thereafter, the kiosk 802 may present one or more coupons to the user based on the preferences set by the user in his profile. The user may choose to use a coupon for purchasing an item. Once the user presents the coupon to a merchant, the rest of the process may occur similar to the one described above in connection with FIG. 9.

In some embodiments, the identification and authentication server computer 820 may be located remote to the kiosk 802. In other embodiments, the identification and authentication server computer 820 may be located in the kiosk 802 itself and synchronized periodically with a central server located remotely. In some embodiments, the identification and authentication server computer 820 and the payment processing network computer 830 may be implemented as a single system.

In some embodiments, instead of a kiosk, the user may use his mobile device, e.g., mobile device 214 above, a tablet, a laptop, a PDA etc. to receive coupons and conduct the transaction. In this embodiment, the user's mobile device 214 captures an image/video/audio of the user and sends that information along with a device ID of the mobile device, e.g., a serial number, IMEI number, etc. to the identification and authentication server computer 820. The identification and authentication server computer 820 can create an association between the device ID and the user audio/video/image. The identification and authentication server computer 820 can then communicate one or more coupons each having a coupon ID to the user's mobile device 214. Thereafter when the user used his mobile device 214 to conduct a transaction using the coupon (e.g., using NFC technology), the merchant system where the transaction occurs can send the device ID of the mobile device 214, an image/video/audio of the user captured at the merchant site, payment device details, among other things, to the identification and authentication server computer 820. The identification and authentication server computer 820 can compare the received information to the stored information to determine the identity and authenticate the user.

If the transaction is authorized, the identification and authentication server computer 820 can update the user loyalty/rewards account with any points/rewards associated with the transaction. In some embodiments, the identification and authentication server computer 820 may send a message to the user mobile device of successful update to the loyalty/rewards account.

Figure 10:
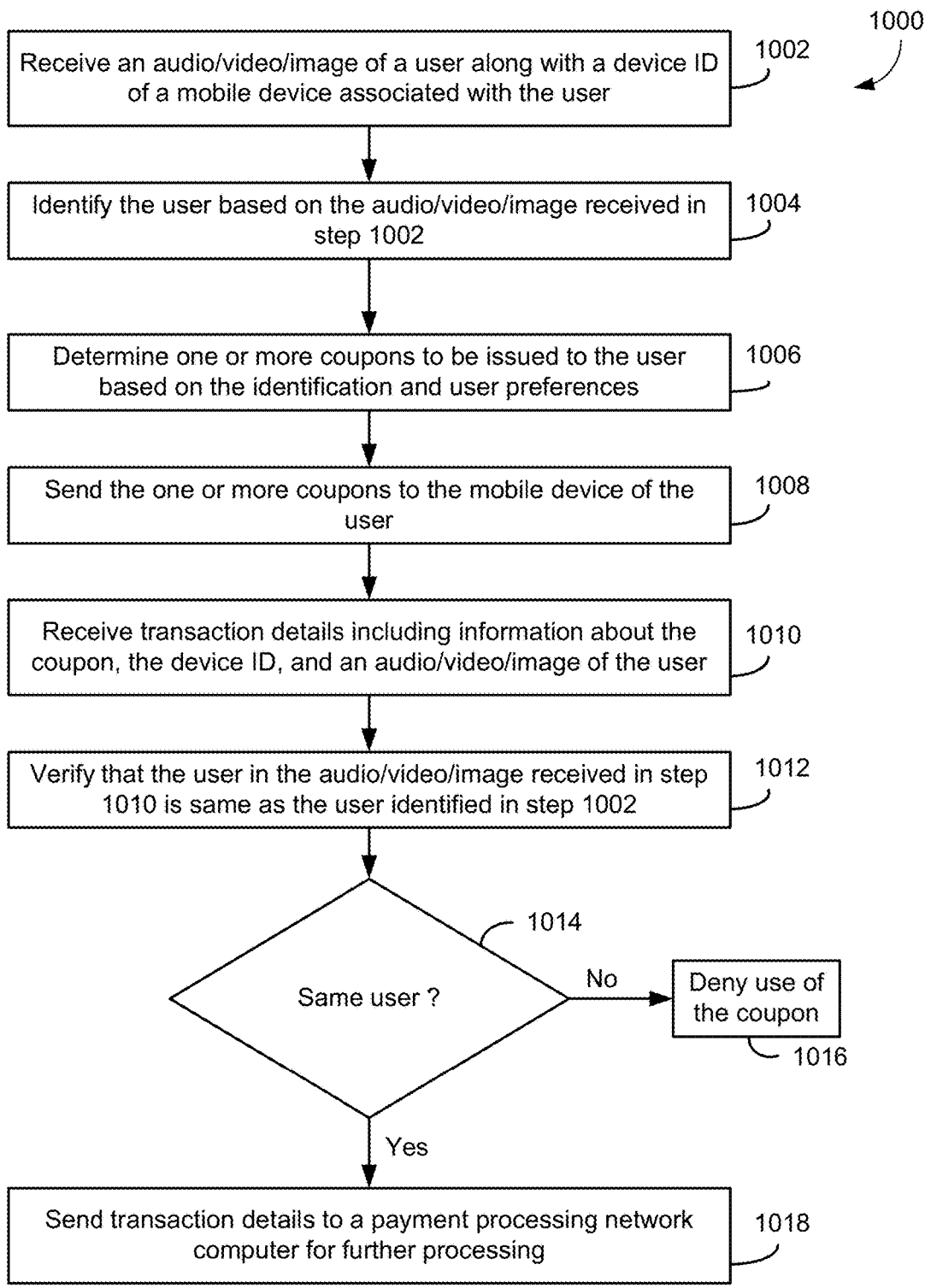
FIG. 10 is a flow diagram of a process for using a coupon according to another embodiment of the present invention.

FIG. 10 is a process 1000 of a method for processing a transaction according to an embodiment of the present invention. A mobile device 214 of a user captures an image/audio/video of the user. The identification and authentication server computer 820 receives the user audio/video/image along with a device ID of the mobile device (Step 1002). The identification and authentication server computer 820 may use the information received from mobile device 214 to identify the user (Step 1004), e.g., by consulting a user database. Once the user is identified, the identification and authentication server computer 820 may determine one or more coupons to be presented to the user based on preferences set by the user in the user profile (Step 1006). The identification and authentication server computer 820 may then send the determined coupons to the user's mobile device 214 (Step 1008).

When the user uses one of the received coupons 814 to make a purchase, the identification and authentication server computer 820 receives the coupon ID, the device ID, a new audio/video/image of the user, and transaction details from the merchant system where the transaction is being conducted (Step 1010). The identification and authentication server computer 820 may verify that the user appearing the audio/video/image received from the merchant system is the same user to whom the coupon 814 was issued (Step 1012), e.g., using any one of the techniques described above. For example, the identification and authentication server computer 820 may compare the device ID and the audio/video/image of the user received in step 1002 to the device ID and the audio/video/image of the user received in step 1010 using any of the image/face recognition and/or accelerometer comparison techniques discussed above.

If it is determined that the user in the received audio/video/image is not the same as the user to whom the coupon 814 was originally issued (Step 1014), the identification and authentication server computer 820 may deny the use of the coupon (Step 1016). If it is determined that the user in the received audio/video/image is the same as the user to whom the coupon was originally issued, the identification and authentication server computer 820 may send the transaction details to a payment processing network computer for further processing (Step 1018).

It will be appreciated that process 1000 described herein is illustrative and that variations and modifications are possible. Acts described as sequential can be executed in parallel, order of acts can be varied, and acts can be modified or combined.

In some embodiments, any item associated with the user may be used to authenticate the user. For example, it is not necessary that the user's audio/video/image be used to authenticate the user. The user may designate any unique object associated with the user in order to authenticate the user. For example, the user may designate his automobile, his watercraft, an antique object that belongs to the user, etc. as his identification mechanism. In this instance, when the user initiates a transaction, the identification and authentication server computer may ask the user to send identifying information. In response the user may send the picture of his automobile or the antique object, which may then be used to authenticate the user.

In some embodiments, electromagnetic signature emitted by a user device may be used as the identifier for authenticating the user. In other embodiments, information associated with a user device may be used to "digitally sign" the image/video/audio sent by the user to increase authenticity and further reduce the chance of tampering with the data. For example, the user device may be a mobile communication device (e.g., as illustrated in FIGS. 2A and/or 2B). The mobile communication device may have several unique identifiers associated with it such as serial number, IMEI number, MAC address, phone number, etc. When a user captures an image/video/audio etc. with this user device, the user device may automatically "sign" the captured image/audio/video with one or more of its unique identifiers. The captured image/audio/video may either be annotated with the unique identifier or the unique identifier may be embedded in the captured data. After identification and authentication server computer 300 receives the captured data, it can strip the annotation and or decrypt the data to extract the embedded information and compare that against stored information to further confirm that the captured data was indeed captured using a authorized device.

In certain embodiments, identification and authentication server computer 300 may reject the transaction if the requested data was not captured using an authorized device. For example, consider that user A registers his mobile phone during the registration/enrollment process described above. Thereafter identification and authentication server computer 300 received request for authorization of a transaction allegedly initiated by user A. Identification and authentication server computer 300 then requests user A to send his video for authentication. Consider that user A uses user B's mobile device to capture his video and sends the video to identification and authentication server computer 300. In this instance, the following may happen (a) the captured video may not be "signed" with any device specific information or (b) the captured video will be signed with user B's device information. In either scenario, identification and authentication server computer 300 can determine that the video, even if of user A, was not captured using user A's mobile device. Based on this determination, identification and authentication server computer 300 may not authenticate user A and recommend that the transaction be denied.

Embodiments of the present invention may be used in cross-border transactions such as money transfer transactions. In countries with high fraud rates, e.g., certain countries in Africa and South America, cross-border money transfer is risky for all parties involved. However, the financial institutions bear the brunt of the losses that arise from fraudulent transactions. Embodiments of the present invention may be used to limit/eliminate fraud by requiring more robust authentication techniques described above. Since the authentication techniques disclosed herein mainly authenticate a user, it eliminates the need for device authentication and the entire authentication process is device agnostic. An exemplary embodiment for use in cross-border transaction is described below.

Figure 11:
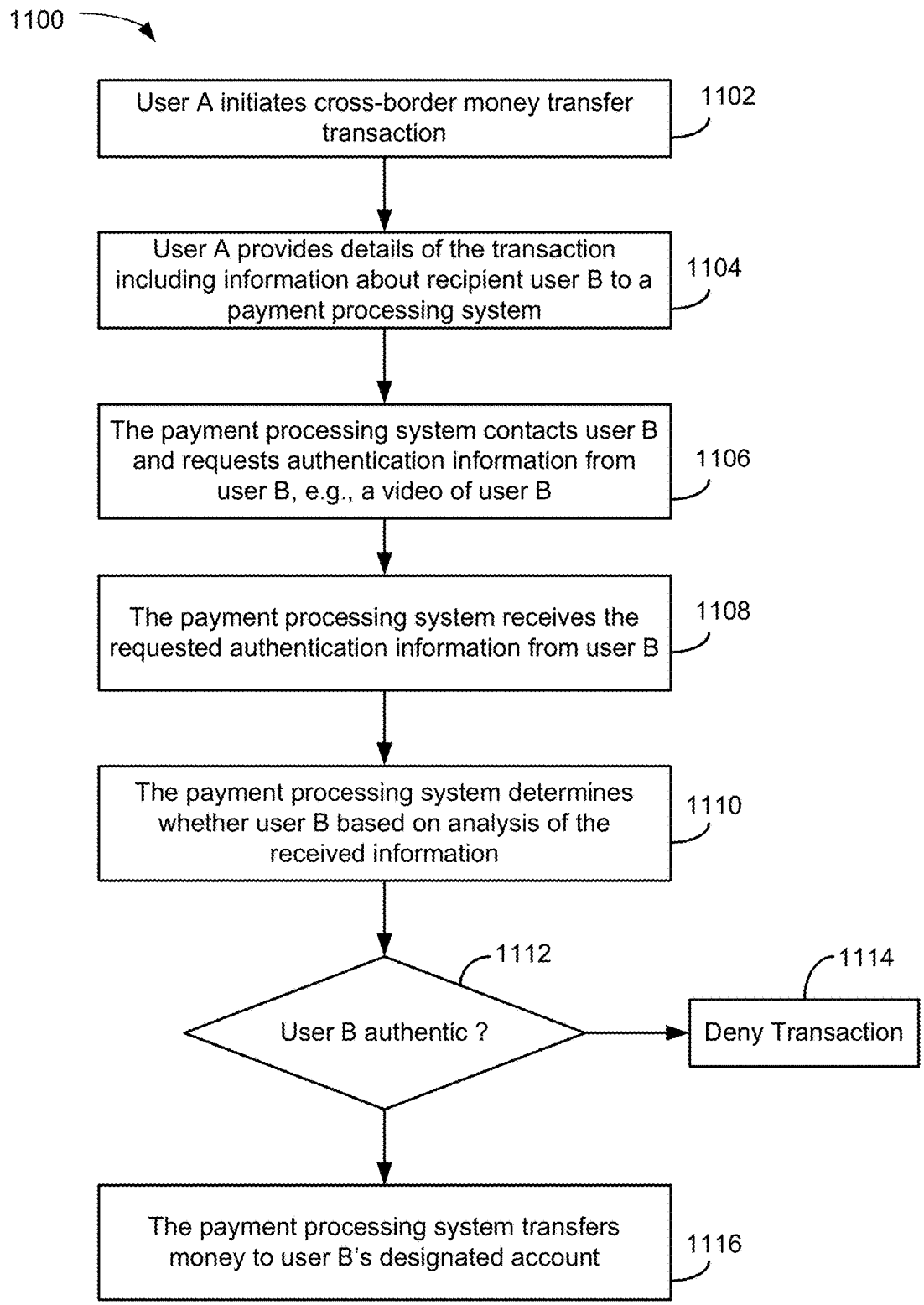
FIG. 11 is a flow diagram of a process for authenticating a user according to an embodiment of the present invention.

FIG. 11 is a flow diagram of a process 1100 for conducting a cross-border transaction according to an embodiment of the present invention. At step 1102, a user A initiates a cross-border money transfer transaction. For instance, user A may access a payment application on his mobile device to initiate the money transfer transaction. At step 1104, the user may provide the details of the transaction, e.g., amount to be transferred, recipient user B information, etc. These details are then received by a payment processing system. In this embodiment, the payment processing system may also perform the user authentication described above. At step 1106, the payment processing system contacts recipient user B in order to authenticate user B. User B may be asked to provide authentication information about himself/herself, e.g., image/audio/video etc. At step 1108, the payment processing system receives the requested information from user B.

At step 1110, the payment processing system may determine whether the recipient user B is authentic, e.g., using any of the authentication techniques described above. If user B is determined to be authentic at step 1112, the payment processing system completes the money transfer process and credits the designated account for user B at step 1116. However, if at step 1112, it is determined that user B is not who/she alleges to be (i.e. not authentic), then the payment processing system denies the transaction at step 1114. Thus, both the sender (user A), the financial institution processing the money transfer, and recipient (user B) are protected from fraud.

It should be appreciated that the specific steps illustrated in FIG. 11 provide a particular method of performing a cross-border payment transaction according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12:
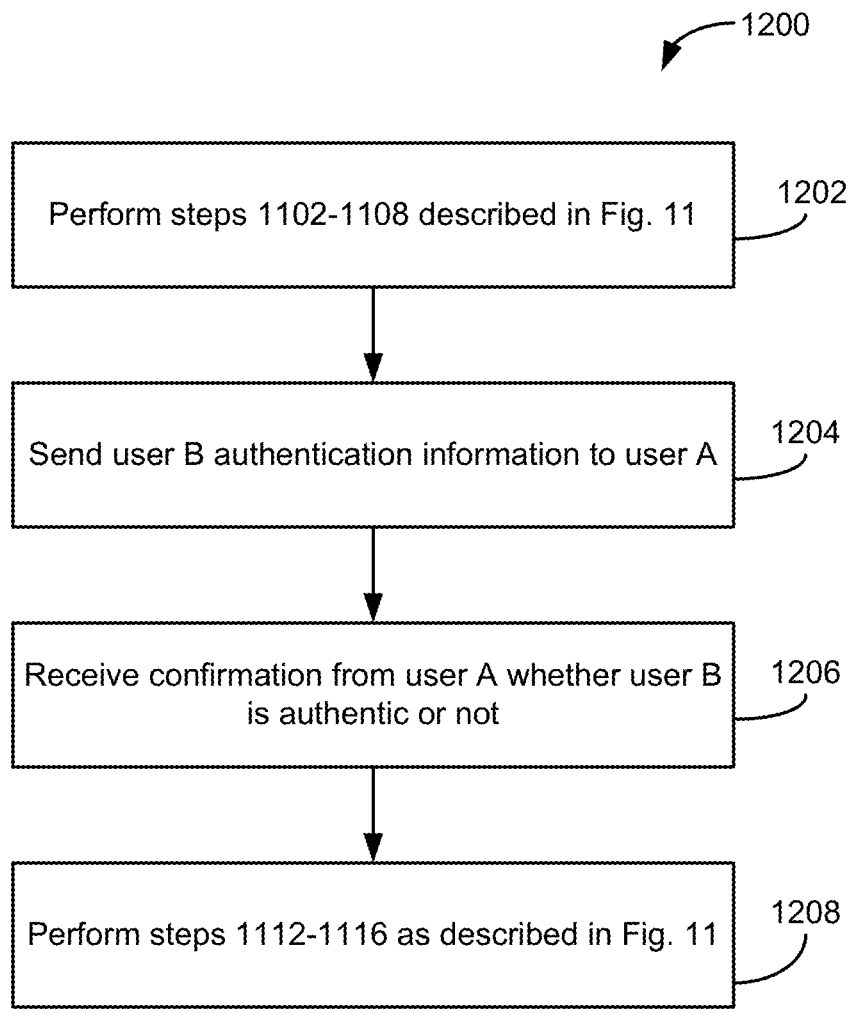
FIG. 12 is a flow diagram of a process for authenticating a user according to another embodiment of the present invention.

FIG. 12 is a flow diagram of a process 1200 for performing a cross-border transaction according to another embodiment of the present invention. Process 1200 can be used in instances where the sender (user A) knows the recipient (user B), e.g., son sending money to his mother.

Step 1202 includes the steps 1102-1108 as described in relation to FIG. 11 above; hence the description is not repeated here for brevity. Once the payment processing system receives the authentication information from user B, it sends that authentication information to user A at step 1204. For example, the authentication information may be a picture of user B, a voice sample of user B, a pre-arranged passphrase that is only known to user A and user B, etc. The payment processing systems asks user A to authenticate the user based on the authentication information. Since user A knows user B, it would be easy for user A to authenticate user B based on the authentication information. The payment processing system, at step 1206, may receive conformation from user A on whether user B is authentic or not. Steps 1204 and 1206 may be transparent to user B thereby reducing the likelihood that user B may manipulate the authentication information. Depending on whether or not user A confirms the authenticity of user B, steps 1112-1116 described in connection with FIG. 12 may be performed (step 1208).

It should be appreciated that the specific steps illustrated in FIG. 12 provide a particular method of performing a cross-border payment transaction according to an embodiment of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

In addition to ensuring that correct person receives the payment, the techniques described above generate data that is useful for exception handling and other post transaction issues. For example, if either user A denies sending the money and/or user B denies receiving the money, the authentication information, confirmation by user A, etc. can be used to ascertain the transaction details and to respond to any complaints either by the sender or the receiver. In some embodiments, in order for the payment processing system to authenticate user B, the payment processing system may have "reference" or "profile" information for user B stored in a database, e.g., user database 312 of FIG. 3. There are various ways in which the payment processing system (and/or identification and authentication server computer 300) may receive this "reference" information about user B.

In one embodiment, when user A sends money to user B for the first time, the payment processing system may execute process 1200. Once user A authenticates user B, the authentication information for user B may be saved by the payment processing system in the database as the reference information. Any subsequent transaction between user A and user B may follow process 1100, where the payment processing system authenticates user B without user A's help. In another embodiment, both user A and user B may be asked to enroll in the money transfer program and as part of the enrollment, a profile may be generated for both users A and B that includes the reference authentication information.

In a particular embodiment, techniques described herein can be used in a buyer-seller type transactions. Recently, person-to-person selling is on the rise. People buy all types of goods including used cars, furniture, etc. directly from the seller. Such a transaction is beneficial to both the buyer and the seller. However, one of the big issues in such a transaction is trust and whether the buyer and the seller can rely on each other to fulfill their part of the bargain. User authentication techniques disclosed herein may be used to facilitate such transaction and reduce the chance of fraud.

Consider that a seller is interested in selling a painting and advertises it over the internet. A potential buyer may contact the seller via third party service that provides the aforementioned user authentication and validation service. Consider that both the buyer and seller are registered with the third party service provider. The seller may be asked to provide an image of himself with the painting, a video of himself with the painting, etc. along with other identification information. Similarly, the buyer may also be asked to provide identification information such as image/audio/video, and/or other information described above. The third party service provider may then authenticate both the buyer and the seller using the techniques disclosed above. Once both the buyer and the seller are authenticated by the third party service provider, the buyer may initiate a payment transaction to pay for the painting. The third party service provider (or a payment processing system) may only authorize a partial payment, e.g., 50% and hold the remaining amount in escrow. The seller will then be asked to send the painting along with some proof that the seller has indeed sent the painting. For example, the seller may be asked to send a video of himself/herself shipping the painting from a particular location. The video can be analyzed to ensure that the seller has indeed shipped the painting.

Once the painting reaches the buyer, the buyer will be asked to send a proof of receipt, e.g., video/image of the painting. This video/image can be compared with the video/image received from the seller to ensure that it is the same painting. Once the buyer has confirmed receipt of the painting, the third party service provider can release the remaining payment to the seller's account thus completing the transaction. This will help minimize the possibility of fraud on either the buyer or the seller side.

Figure 13:
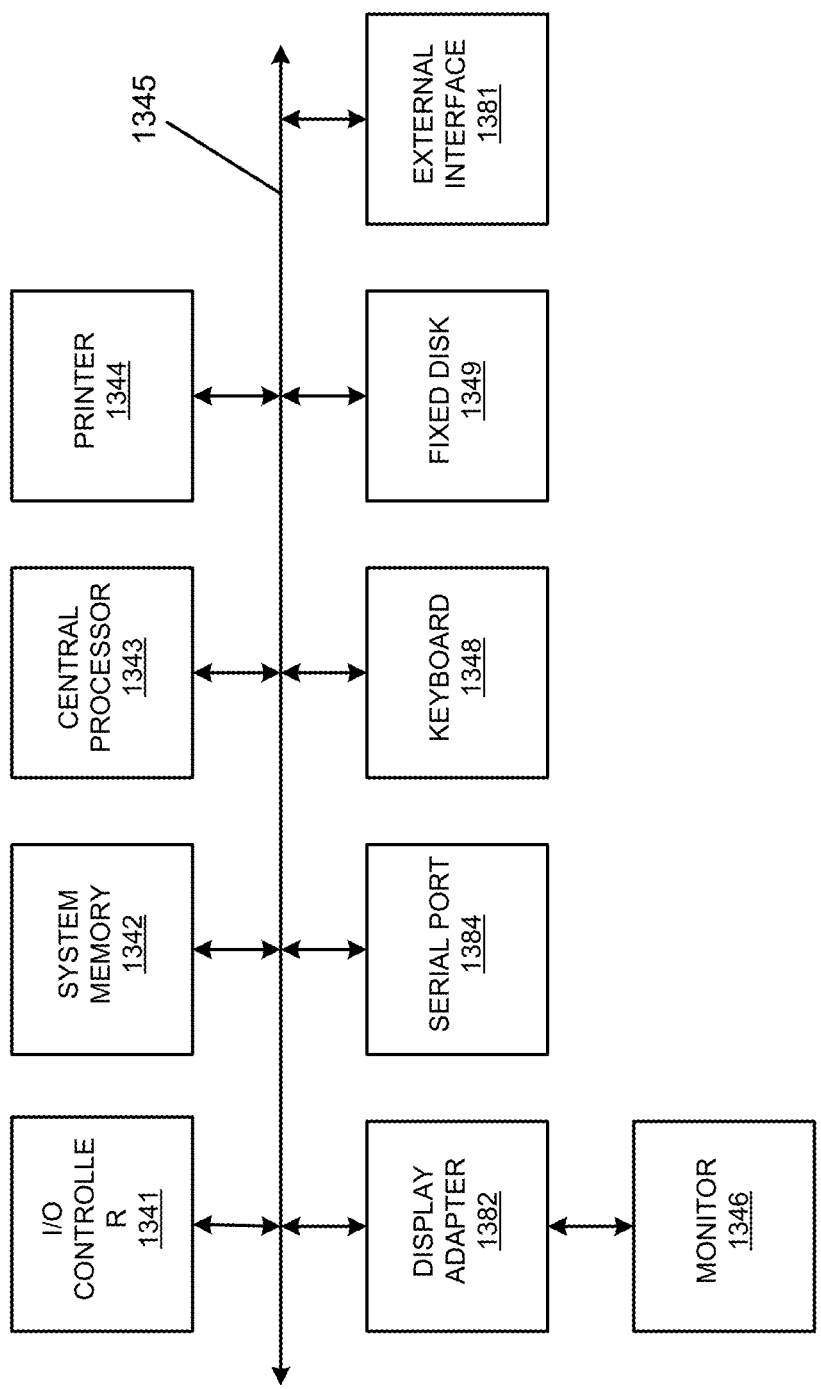
FIG. 13 is a block diagram of a computer system.

FIG. 13 is a high level block diagram of a computer system that may be used to implement any of the individual components described above and may include one or more of the subsystems or components shown in FIG. 13, which is a block diagram of a computer apparatus. The subsystems shown in FIG. 13 are interconnected via a system bus 1345. Additional subsystems such as printer 1344, keyboard 1348, fixed disk 1349, monitor 1346, which is coupled to display adapter 1382, and others are shown. Peripherals and input/output (I/O) devices, which couple to I/O controller 1341, can be connected to the computer system by any number of means known in the art, such as serial port 1384. For example, serial port 1384 or external interface 1381 can be used to connect the computer apparatus to a wide area network such as the Internet, a mouse input device, or a scanner. The interconnection via system bus 1345 allows central processor 1343 to communicate with each subsystem and to control the execution of instructions from system memory 1342 or fixed disk 1349, as well as the exchange of information between subsystems. The system memory 1342 and/or fixed disk 1349 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

In addition, embodiments of the present invention can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various non-transitory computer readable media for storage and/or transmission; suitable media include magnetic disk or tape, optical storage media such as compact disk (CD) or DVD (digital versatile disk), flash memory, and the like. Computer readable media encoded with the program code can be packaged with a compatible device or provided separately from other devices (e.g., via Internet download).

What is claimed is:

1. A method comprising:
receiving, by a server computer, information about a coupon and a video of a first user to whom the coupon is issued as well as a first accelerometer data;
receiving, by the server computer, transaction information for a transaction, the transaction information including a video of a second user and the information about the coupon issued as well as a second accelerometer data;
determining, by the server computer, whether the second user is same as the first user by comparing the first accelerometer data for the video of the first user with the second accelerometer data for the video of the second user; and
upon determining that the second user is same as the first user, authorizing, by the server computer, use of the coupon.

2. The method of claim 1 further comprising:
if it is determined that the second person is not the same as the first person:
rejecting the coupon; or
sending a message to a mobile device of the first user requesting additional authentication information.

3. The method of claim 1 wherein the information about the coupon comprises a first coupon identifier and wherein the method further comprises:
receiving a second coupon identifier as part of the transaction information; and
comparing the second coupon identifier with the first coupon identifier to determine whether the second user is same as the first user.

4. The method of claim 1 further comprising:
causing the first user to be enrolled in a loyalty or rewards program associated with the coupon; and
updating a loyalty or rewards program account of the first user using a portion of transaction details associated with the transaction.

5. The method of claim 1 further comprising:
creating a profile for the first user using the received information about the coupon and the video of the first user; and
subsequent to authorizing use of the coupon for the transaction, adding payment device information associated with the transaction to the profile.

6. A computer server system comprising:
one or more processors; and
a storage medium coupled to the one or more processors, the storage medium encoded with a set of instructions, which when executed, causes the one or more processors to perform a method comprising:
receiving information about a coupon and a first accelerometer data related to a video of a first user to whom the coupon is issued;
receiving transaction information for a transaction, the transaction information including a second accelerometer data related to a video of a second user and the information about the coupon;
determining whether the second user is same as the first user by comparing the first accelerometer data related to the video of the first user with the second accelerometer data related to the video of the second user; and
upon determining that the second user is same as the first user, authorizing use of the coupon.

7. The system of claim 6 wherein the method further comprises:
if it is determined that the second person is not the same as the first person:
rejecting the coupon; or
sending a message to a mobile device of the first user requesting additional authentication information.

8. The system of claim 6 wherein the information about the coupon comprises a first coupon identifier and wherein the method further comprises:
receiving a second coupon identifier as part of the transaction information; and
comparing the second coupon identifier with the first coupon identifier to determine whether the second user is same as the first user.

9. The system of claim 6 wherein the method further comprises:
creating a profile for the first user using the received information about the coupon and the first acceleration data related to the image or the video of the first user;
causing the first user to be enrolled in a loyalty or rewards program associated with the coupon;
upon authorizing use of the coupon for the transaction, adding payment device information associated with the transaction to the profile; and
updating a loyalty or rewards program account of the first user using a portion of transaction details associated with the transaction.

10. The system of claim 6 wherein the method further comprises:
receiving a specification of one or more preferences for receiving coupons, the one or more preferences including a merchant or a category of item;
receiving a request for one or more coupons; and
determining and presenting the coupon, wherein the coupon is determined based on the one or more preferences.

11. A method comprising:
receiving, by a server computer, from a first computer, a first device identifier (ID), a first coupon ID associated with first coupon data, and an image, audio, or video of a first user, wherein the first user is associated with a first coupon;
receiving, by the server computer, from a second computer, a second device ID, a second coupon ID associated with second coupon data, and an image, audio, or video of a second user, wherein the second user is associated with a second coupon;
comparing, by the server computer, the first device ID, the first coupon ID, first accelerometer data associated with the video of the first user, and the image, audio, or video of the first user to the second device ID, the second coupon ID, second accelerometer data associated with the video of the second user, and the image, audio, or video of the second user, respectively to determine whether the second user is same as the first user; and
authorizing, by the server computer, use of the second coupon data if it is determined that the second user is same as the first user and the second coupon data is same as the first coupon data.

12. The method of claim 11 further comprising denying the use of the second coupon data if (a) the first coupon ID does not match the second coupon ID or (b) it is determined that the second user is not the same as the first user.

13. The method of claim 11 further comprising denying the use of the second coupon data if (a) the first coupon ID does not match the second coupon ID and (b) it is determined that the second user is not the same as the first user.

14. The method of claim 11 wherein the first user is associated with a user profile, the method further comprising:
receiving an image of the first user; and
automatically presenting a list of coupons including the first coupon, wherein the list of coupons is presented based on the user profile associated with the first user.

15. A computer server system comprising:
one or more processors; and
a storage medium coupled to the one or more processors, the storage medium encoded with a set of instructions, which when executed, causes the one or more processors to perform a method comprising:
receiving from a first computer, a first device identifier (ID), a first coupon ID associated with first coupon data, and an image, audio, or video of a first user, wherein the first user is associated with a first coupon;
receiving from a second computer, a second device ID, a second coupon ID associated with second coupon data, and an image, audio, or video of a second user, wherein the second user is associated with a second coupon;
comparing the first device ID, the first coupon ID, first accelerometer data associated with the video of the first user, and the image, audio, or video of the first user to the second device ID, the second coupon ID, second accelerometer data associated with the video of the second user, and the image, audio, or video of the second user, respectively to determine whether the second user is same as the first user; and authorizing use of the second coupon data if it is determined that the second user is same as the first user and the second coupon data is same as the first coupon data.

16. The system of claim 15 wherein the method further comprises denying the use of the second coupon data if (a) the first coupon ID does not match the second coupon ID or (b) it is determined that the second user is not the same as the first user.

17. The system of claim 15 wherein the method further comprises denying the use of the second coupon data if (a) the first coupon ID does not match the second coupon ID and (b) it is determined that the second user is not the same as the first user.

18. The system of claim 15 wherein the first user is associated with a user profile and wherein the method further comprises:
   receiving an image of the first user; and
   automatically presenting a list of coupons including the first coupon, wherein the list of coupons is presented based on the user profile associated with the first user.

\* \* \* \* \*